(12) United States Patent
Nejadriahi et al.

(10) Patent No.: US 10,481,463 B2
(45) Date of Patent: Nov. 19, 2019

(54) ALL OPTICAL FAST FOURIER TRANSFORM ON CHIP WITH HEATING TUNABILITY DESIGN, SIMULATION, FABRICATION, AND PERFORMANCE ANALYSIS

(71) Applicant: The George Washington University, Washington, DC (US)

(72) Inventors: Hani Nejadriahi, San Diego, CA (US); Volker J. Sorger, Alexandria, VA (US)

(73) Assignee: The George Washington University, Washington, DC (US)

( * ) Notice: Subject to any disclaimer, the term of this patent is extended or adjusted under 35 U.S.C. 154(b) by 0 days.

(21) Appl. No.: 15/830,747

(22) Filed: Dec. 4, 2017

(65) Prior Publication Data

US 2019/0072833 A1    Mar. 7, 2019

Related U.S. Application Data

(60) Provisional application No. 62/555,531, filed on Sep. 7, 2017.

(51) Int. Cl.
| | |
|---|---|
| *G02F 1/035* | (2006.01) |
| *G02F 1/225* | (2006.01) |
| *G02F 1/01* | (2006.01) |
| *G06E 3/00* | (2006.01) |
| *G02F 1/21* | (2006.01) |

(52) U.S. Cl.
CPC ............ *G02F 1/225* (2013.01); *G02F 1/0147* (2013.01); *G06E 3/003* (2013.01); *G02F 2001/212* (2013.01); *G02F 2001/215* (2013.01)

(58) Field of Classification Search
CPC .. G02F 1/225; G02F 1/0147; G02F 2001/215; G02F 2001/212
See application file for complete search history.

(56) References Cited

U.S. PATENT DOCUMENTS

| | | | |
|---|---|---|---|
| 7,200,308 B2* | 4/2007 | Hochberg | B82Y 20/00 385/122 |
| 2003/0035609 A1* | 2/2003 | Hatanaka | G02B 6/12004 385/15 |

(Continued)

*Primary Examiner* — Ellen E Kim
(74) *Attorney, Agent, or Firm* — Blank Rome LLP

(57) ABSTRACT

The present invention provides optical computing by means of fast Fourier transform Integration on Silicon On Insulator chip technology with implementation in the analog and temporal domain. This is done by cascading (N−2) stages of delayed interferometers (couplers and phase shifters) where a parallel set of N time samples are taken and using the delay lines and phase of the optical components (constructive/deconstructive interference) the DFT is computed. The Optical Fast Fourier Transform (OFFT) design was built on passive components (2×2 couplers: cascaded Mach Zehnder Interferometer) used for addition and subtraction through optical interference, waveguides with short path differences are used for phase shifting and waveguides with long path differences are used for signal delay based on the needed number of outputs. Since the OFFT is a system of imbalanced interferometers, there are additional bends designed to compensate for the difference in power ratios of the arms.

25 Claims, 15 Drawing Sheets

(56) References Cited

U.S. PATENT DOCUMENTS

2014/0092385 A1\* 4/2014 Nitkowski ................ G01J 3/18
356/326
2015/0036967 A1\* 2/2015 Smith .................... H04B 10/90
385/11

\* cited by examiner

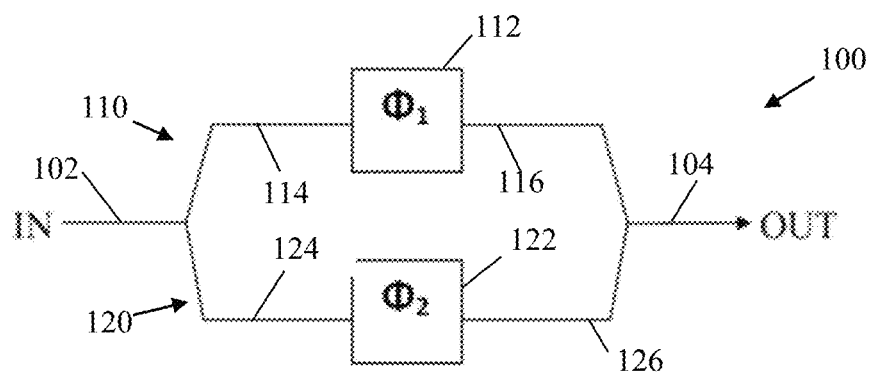
Figure 1.1
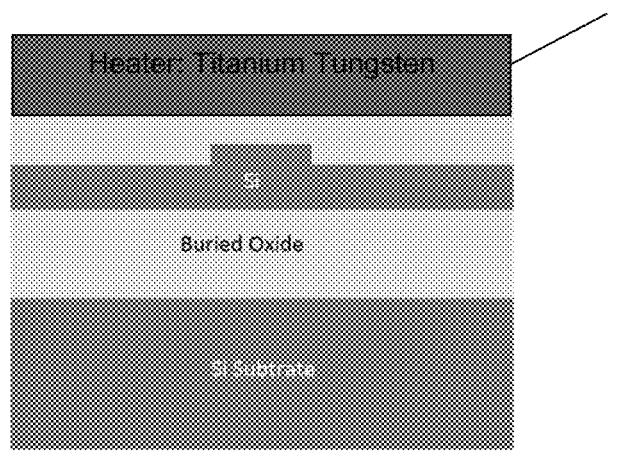
Figure 1.2

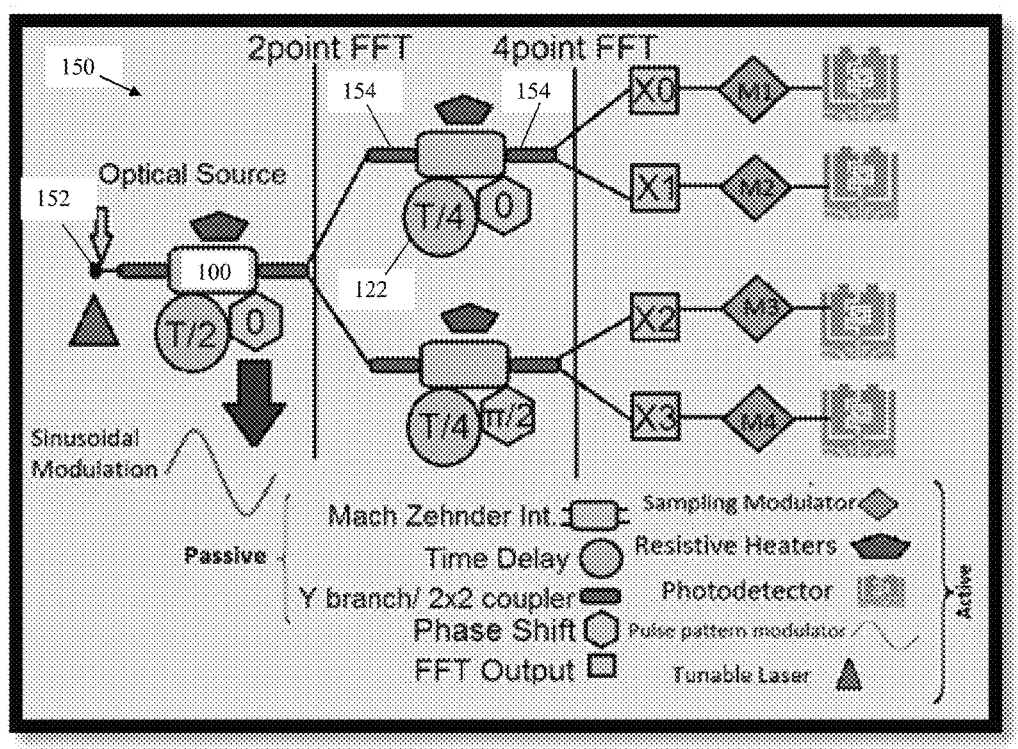
Figure 2.1(a)

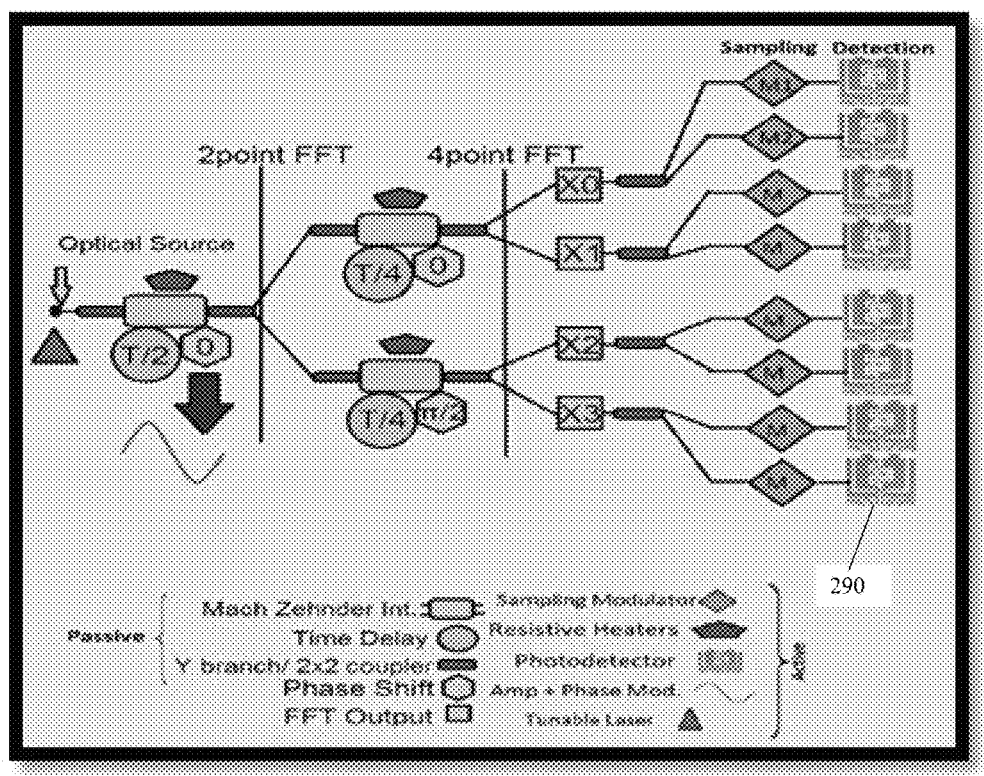
Figure 2.1(b)

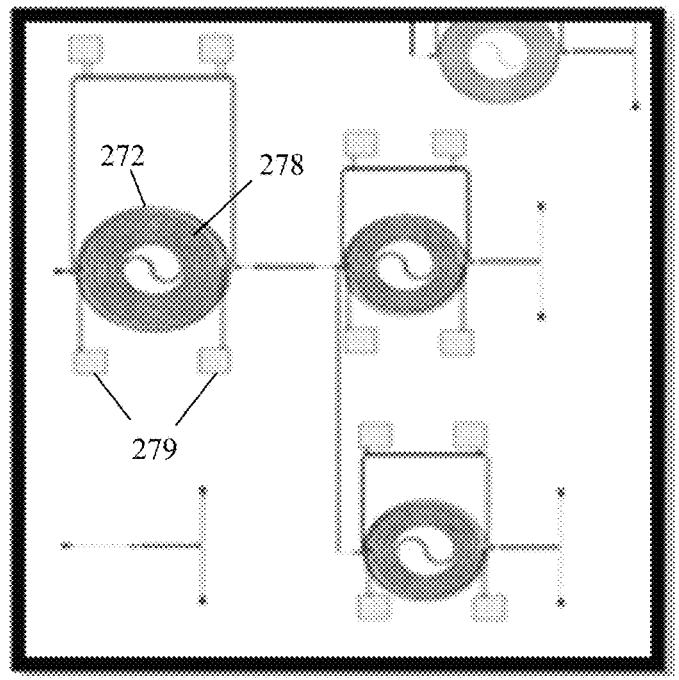
Figure 2.2(a)
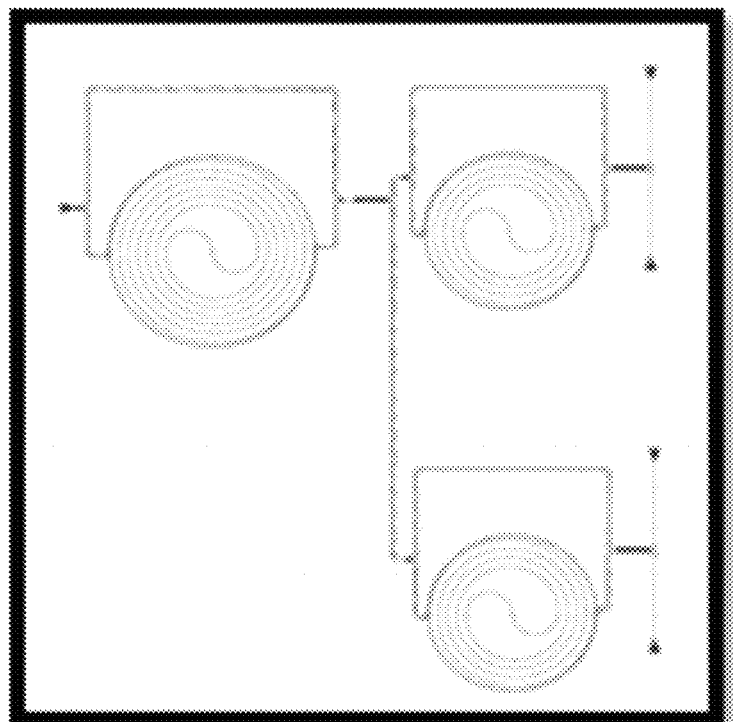
Figure 2.2(b)

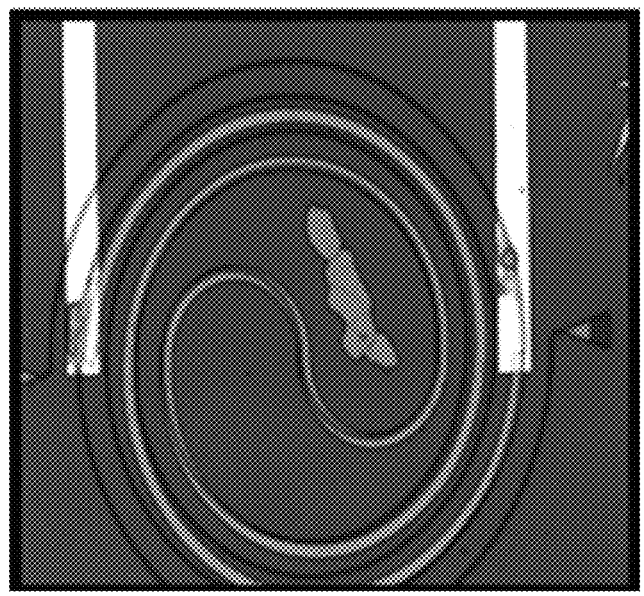
Figure 2.2(d)
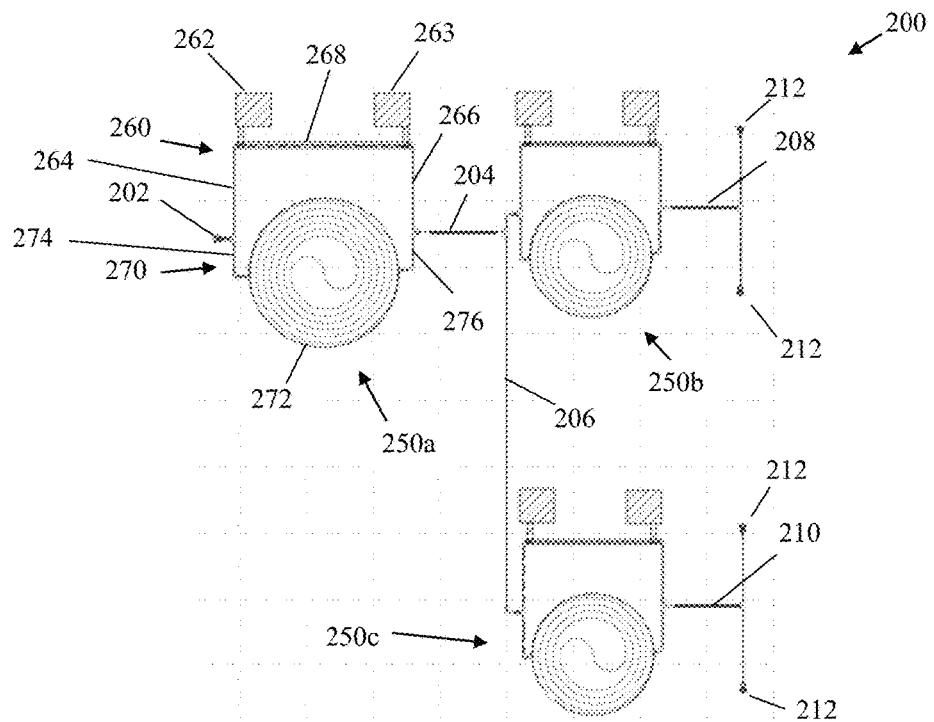
Figure 2.2(c)

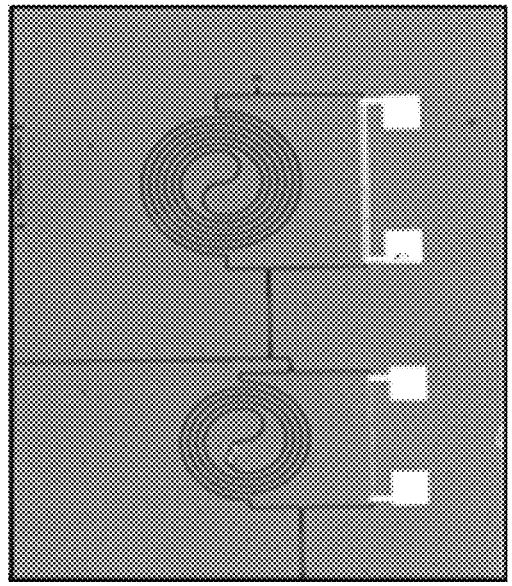
Figure 2.2(e)
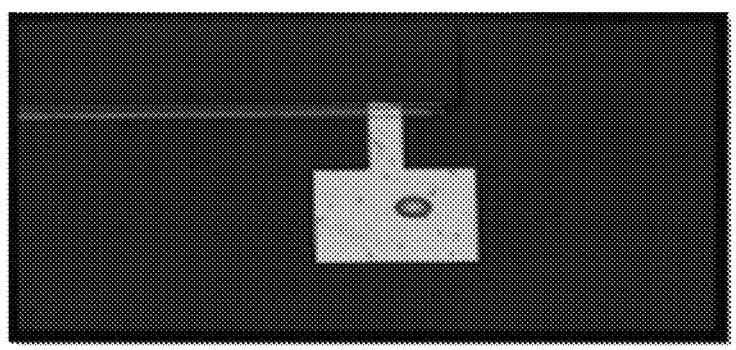
Figure 2.2(f)

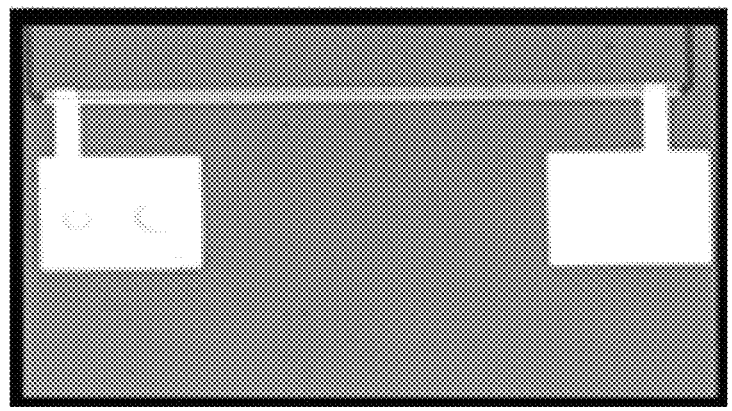
Figure 2.2(g)
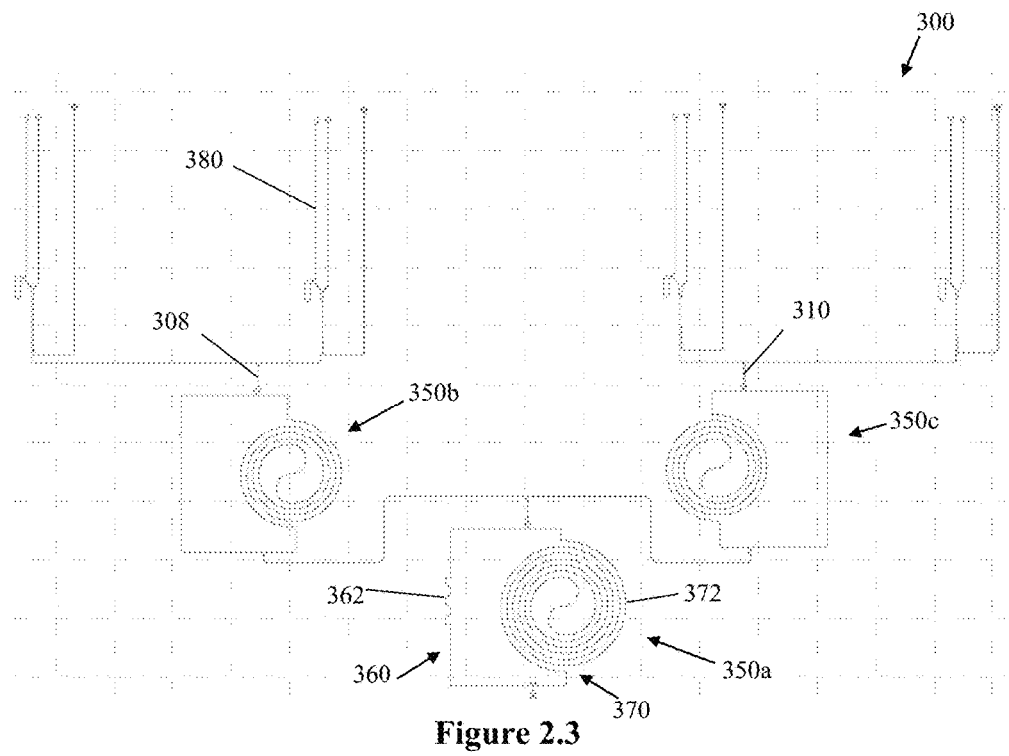
Figure 2.3

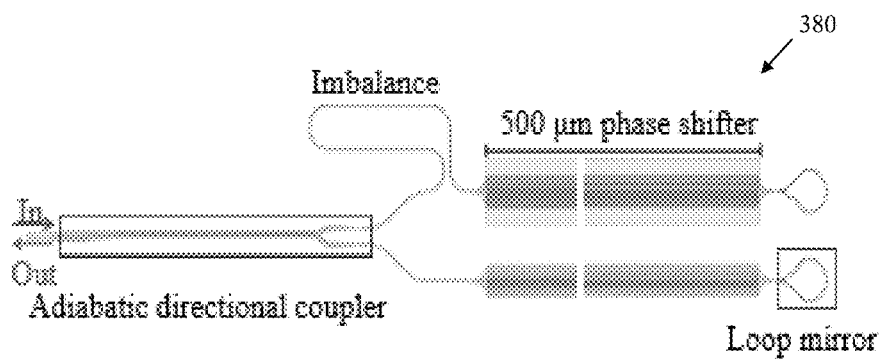
Figure 2.4
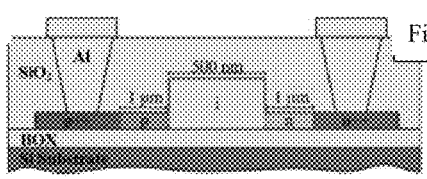
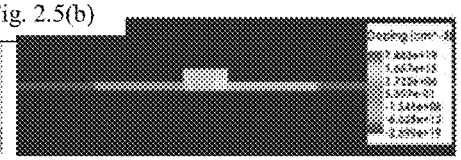
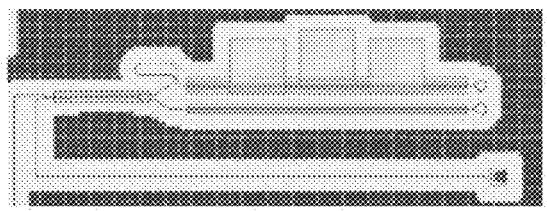
Figure 2.5(c)

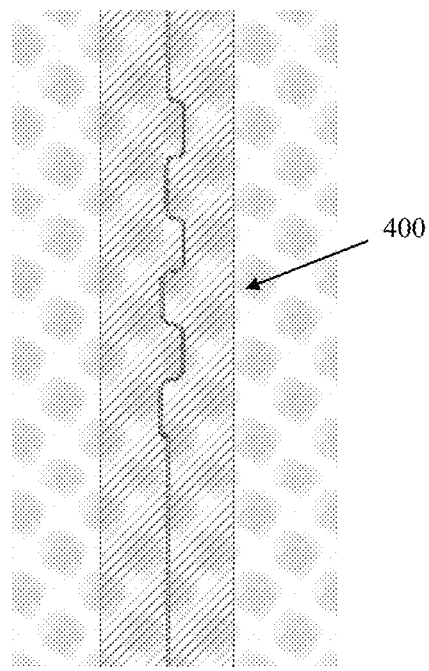
Figure 2.6(a)
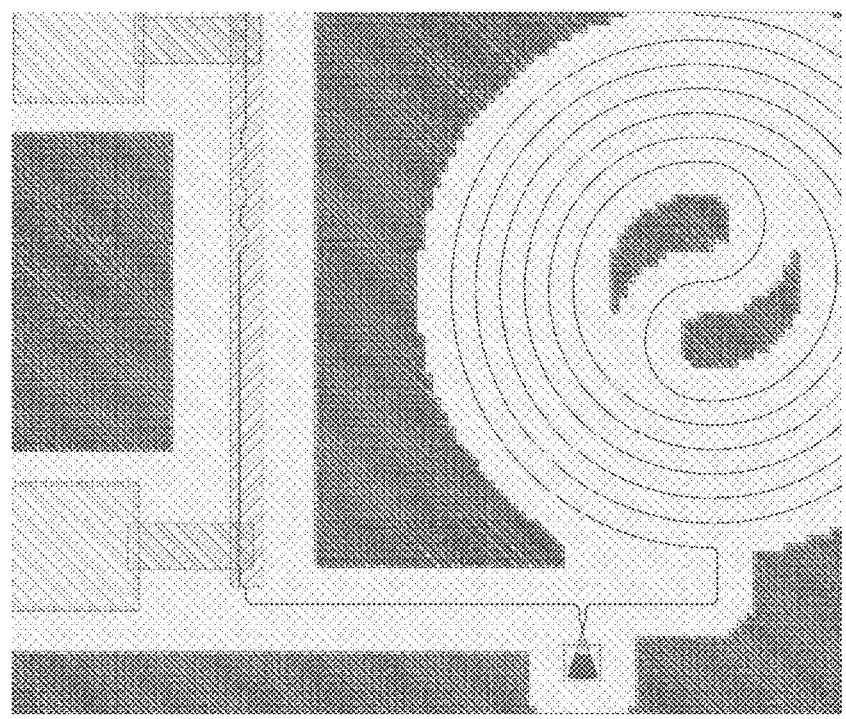
Figure 2.6(b)

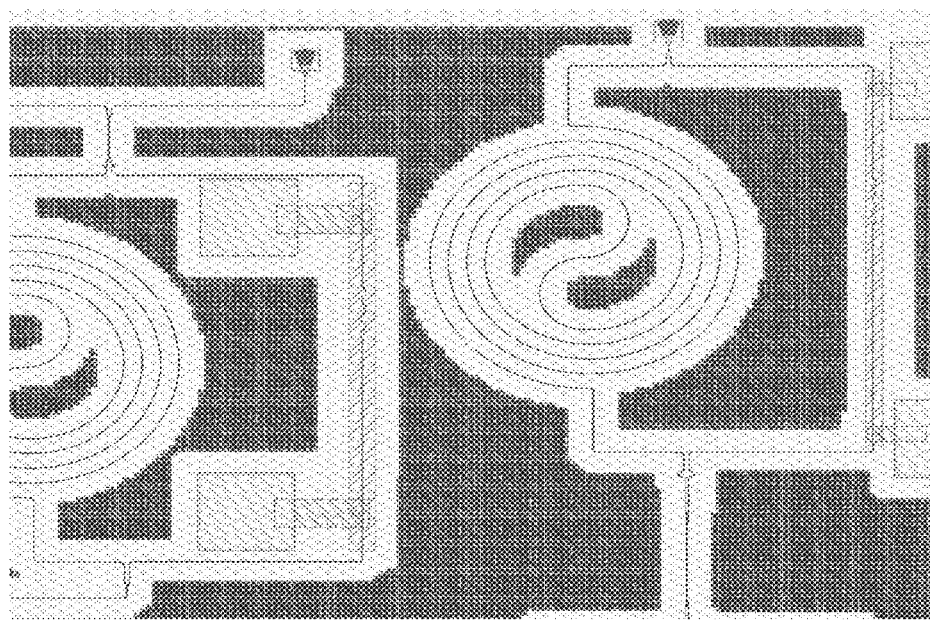
Figure 2.6(c)

Fig. 2.7(a)
Fig. 2.7(b)
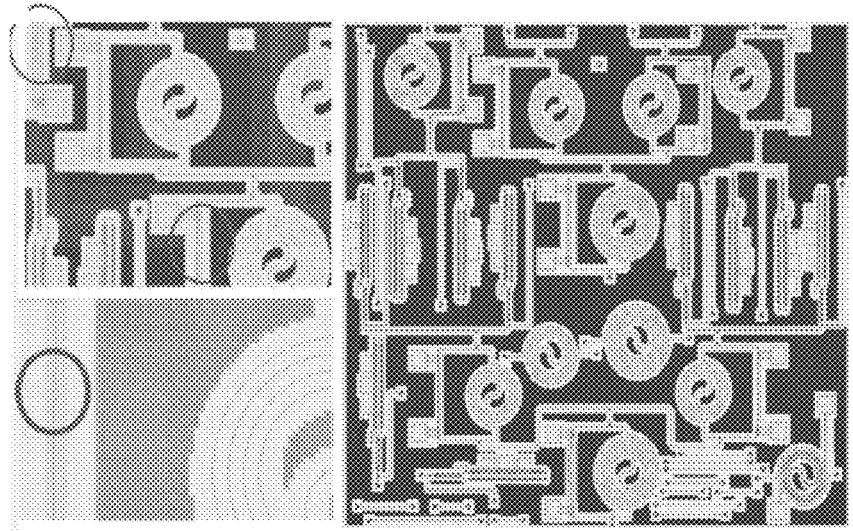
Figure 2.7(c)

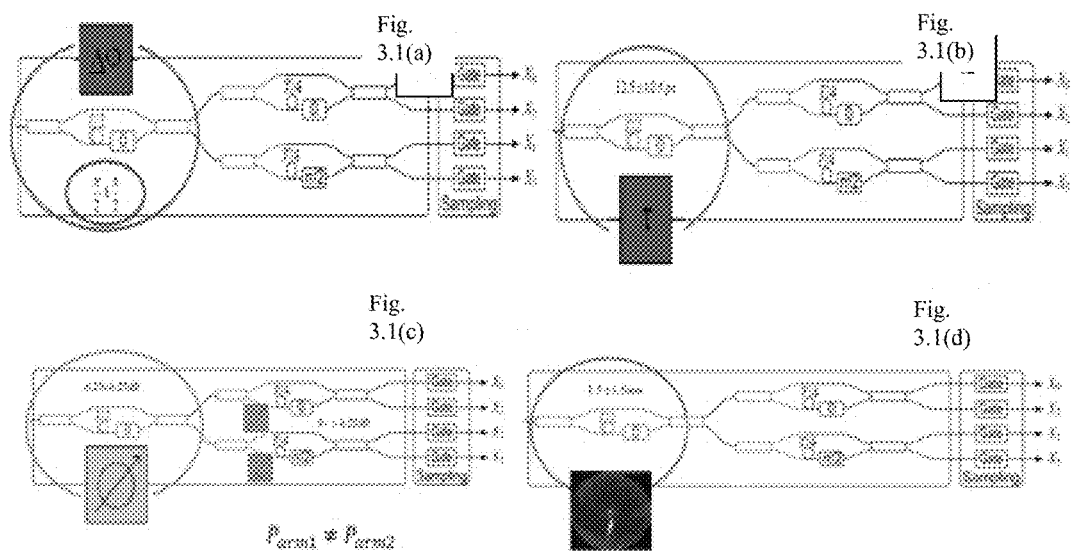
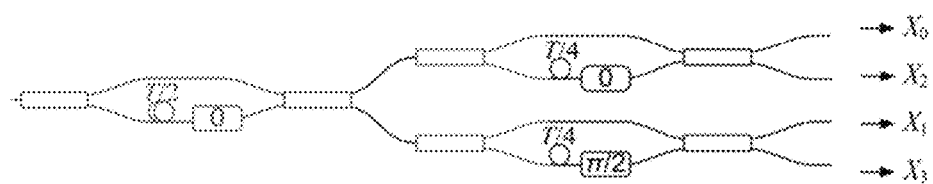
Figure 3.2

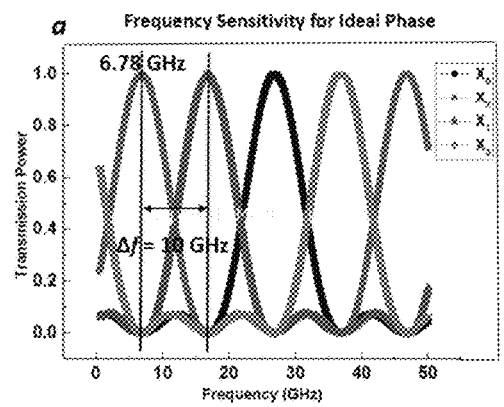 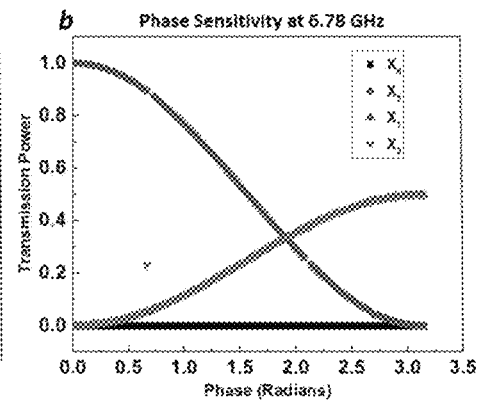
Figure 3.3(a)  Figure 3.3(b)
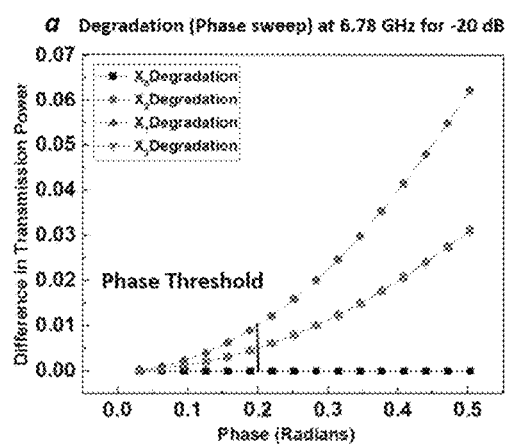 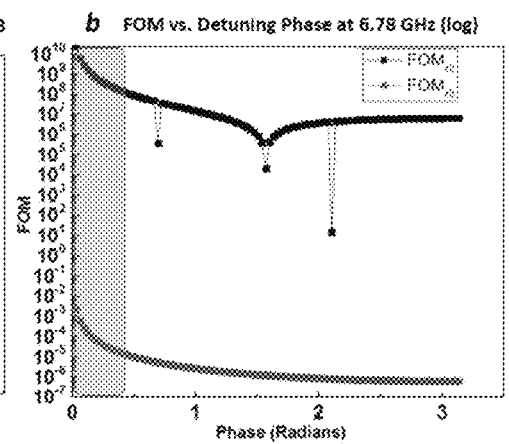
Figure 3.4(a)  Figure 3.4(b)

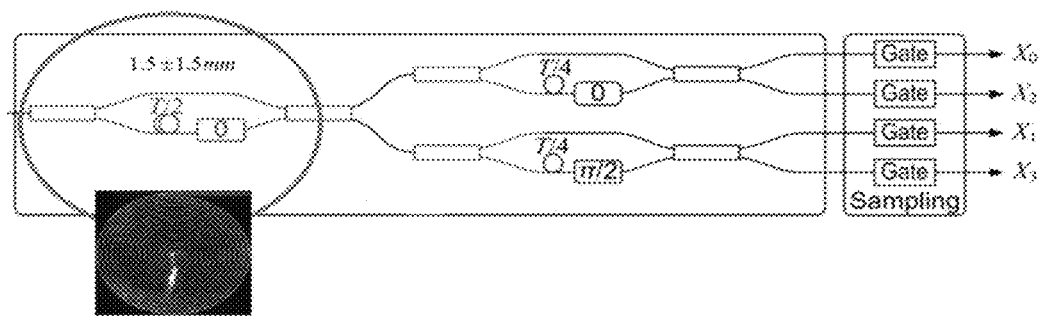
Figure 3.5
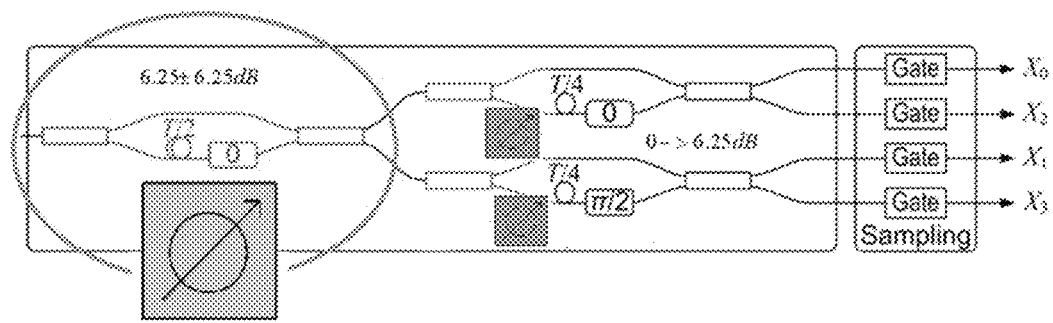
$$P_{arm1} \neq P_{arm2}$$
Figure 3.6

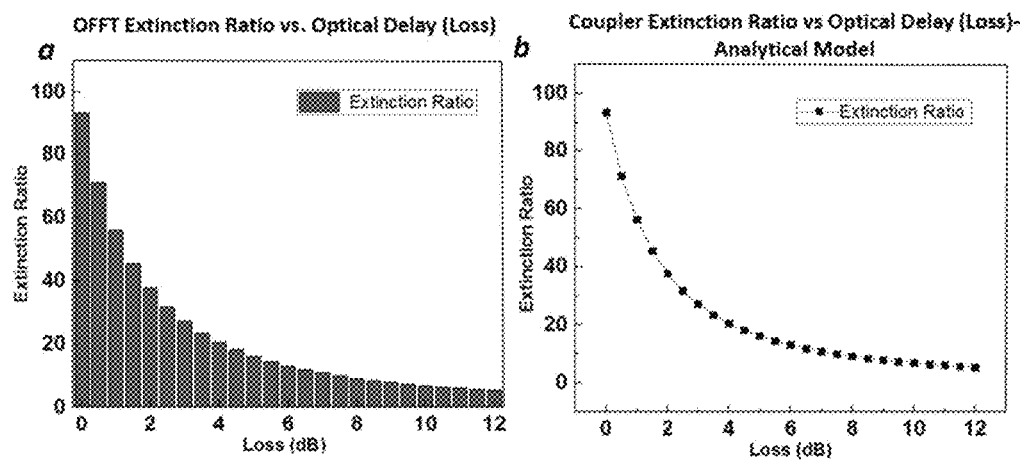
Figure 3.7(a)          Figure 3.7(b)
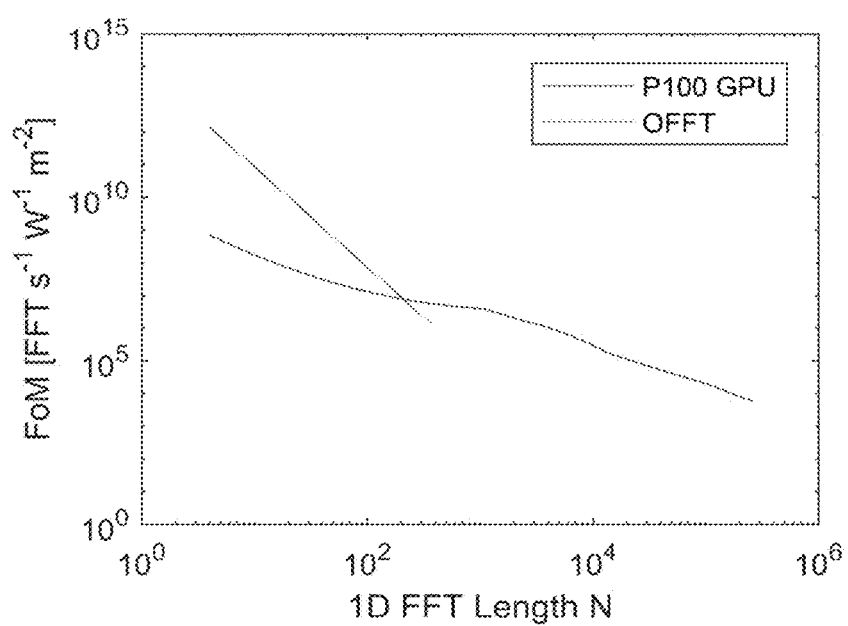
Figure 3.8

ALL OPTICAL FAST FOURIER TRANSFORM ON CHIP WITH HEATING TUNABILITY DESIGN, SIMULATION, FABRICATION, AND PERFORMANCE ANALYSIS

RELATED APPLICATIONS

This application claims the benefit of U.S. Provisional Application No. 62/555,531, filed Sep. 7, 2017, the entire contents of which are incorporated herein by reference.

BACKGROUND OF THE INVENTION

Field of the Invention

The present invention relates to Optical Fast Fourier Transform (OFFT) On Chip design.

Background of the Related Art

Fast Fourier Transform (FFT) has a widespread usage in data and single processing applications such as convolutions, filtering, image processing and data-communication. For instance, the functional analysis of convolution has widespread applications in numerical linear algebra, computer vision, language- image- and signal processing, and neural networks. Discrete convolution is defined for functions on the set of integers, which can be represented with the residue number system (RNS). Conceptually, RNS enables dimensionality reduction of an arithmetic problem by representing a large number as a set of smaller integers, where the number is decomposed by prime number factorization using the moduli as basis functions. These reduced problem sets can then be processed independently and in parallel, thus improving computational efficiency and speed. A second example is the field of convolutional neural networks (CNNs).

A CNN is neural network where instead of fully connecting each input to each output with weights, convolutional filtering connects the network in a spatially local manner. See A. Krizhevsky, I. Sutskever, and G. E. Hinton, "ImageNet classification with deep convolutional neural networks," in Advances in Neural Information Processing Systems vol. 25, F. Pereira et al, Ed. Curran Associates, Inc, 2012, pp. 1097-1105. This convolutional filtering is normally performed by Graphics Processing Units (GPUs). The GPUs convert the input data to the frequency domain with a forward FFT where it is multiplied by a kernel and then converted back into the spatial domain with an inverse FFT. By using OFFTs for convolution instead GPUs, a system can be built to take advantage of the energy efficient arithmetic of wave interference to perform the convolutions of the CNN.

A third application is Orthogonal Frequency Division Multiplexing (OFDM) is a process of encoding digital data on multiple carrier frequencies, which has various applications including for transmission of information such as digital television and audio broadcasting. Fast Fourier Transform (FFT) is widely used as the core process for optical OFDM transmission because of its demonstrably favorable high speed and long-haul data transmission including its high spectral efficiency. See Hillerkuss, D. et al. 26 Tbit s-1 line-rate super-channel transmission utilizing all-optical fast Fourier transform processing, Nature Photon. 5, 364-371 (2011) ("Hillerkuss 1"); Hillerkuss, D., Winter, M., Teschke, M., Marculescu, A., Li, J., Sigurdsson, G., . . . Leuthold, J. (2010), Simple all-optical FFT scheme enabling Tbit/s real-time signal processing. Optics Express, 18(9), 9324, doi:10.1364/oe.18.00932 ("Hillerkus 2"); D. Hillerkuss, A. Marculescu, J. Li, M. Teschke, G. Sigurdsson, K. Worms, S. Ben-Ezra, N. Narkiss, W. Freude and J. Leuthold, "Novel Optical Fast Fourier Transform Scheme Enabling Real-Time OFDM Processing at 392 Gbit/s and beyond," pp. OWW3, 2010/03/21 ("Hillerkuss 3").

Previous research studies in the area of OFFT indicate that such technique can be performed at speeds far beyond the limits of electronic digital processing with negligible energy consumption. However, a temporal FFT integrated in photonic has not been realized, nor designed and optimized. Many of the signal processing applications depend on electronic devices which present a bottleneck to provide higher capacity and lower cost implementations. Hence the maximum processing capacity is limited by the speed and the power consumption. See Hillerkuss 2, 3.

The demand for faster communication and computation is rapidly increasing, and driven by emerging industries such as autonomous vehicles, video streaming, mobile, but most importantly data-analytics. New services such as cloud computing and future optical co-processors require high capacity (possibly optical) data processors, co-processors, and accelerators that can perform mathematical functions in parallel since the electrical counterparts are limited by energy, bandwidth, and speed. OFFT benefits information processing by its high bandwidth and Tbit/sec operating speed. Many have approached this challenge by means of different FFT algorithms. However this is not a fully optimized approach since it lacks a sensitivity analysis on the system level in terms of stability, performance, and footprint at the component level.

SUMMARY OF THE INVENTION

The invention integrates the Optical Fast Fourier Transform (OFFT) on-chip (i.e., an integrated circuit—on a photonic wafer (such as silicon, SiN, or $SiO_2$) semiconductor chip) to minimize the footprint and energy of such operations and maximize the data rate per operation, which is a significant step forward in communication and computation. These constraints of Hillerkus can be bypassed by implementation of all optical devices on-chip. For scaling convenience, this invention utilizes the concept of a simplified FFT scheme proposed by Hillerkuss et al. to simplify the circuit complexity. This, however, is not a necessity, but helps to keep the footprint low. Simplified OFFT has advantages such as higher speed (i.e. short delay), and less energy consumption. This is done by reordering the delays and relabeling the outputs accordingly where a simpler implementation can be found for the optical circuit since the typical FFT algorithm (decimation in time) would be difficult to implement due to its frequent waveguide crossings and large number of waveguide phases that must be accurately controlled. See Hillerkuss 3.

The present invention explores the on-chip characteristics of the OFFT for the first time and investigates how the change in design affects the quality of the output as a function of phase, time delay, and optical loss. We aim to reduce the power consumption, and a boost in data-handling capability at the same time, while minimizing crosstalk from RF signal-coupling, temperature and other external factors that can couple into the prior-art (i.e. fiber-based).

Thus, the present invention provides optical information processing by means of fast Fourier transform Integration on a photonic chip (e.g. such as an Silicon-On-Insulator (SOI) chip technology) with implementation in the analog and temporal domain. This is done by cascading (N−2) stages of delayed interferometers (couplers and phase shifters) where a parallel set of N time samples are taken and using the delay lines and phase of the optical components (constructive/deconstructive interference) the DFT is computed. Hence it is important to understand the behavior and the quality of the Optical Fast Fourier Transform (OFFT) and its sensitivity due to the important role of phase, time delay, and power to overcome the system of delayed interferometers to become unstable. This was done by analyzing the characteristics of the extinction ratio of the OFFT as a function of the phase, time delay, and power. The OFFT design was built on passive components (2×2 couplers: cascaded Mach Zehnder Interferometer) used for addition and subtraction through optical interference, waveguides with short path differences are used for phase shifting and waveguides with long path differences are used for signal delay based on the needed number of outputs.

While in principal an OFFT network could be created with perfect phase alignment, in practice active phase calibration at a specific temperature is required to compensate for fabrication variance. This phase calibration was accomplished with a heating element placed along on one of the waveguide paths of the cascaded interferometers. Since the OFFT is a system of imbalanced interferometers, there are additional bends designed to compensate for the difference in power ratios of the arms. This provides design-freedom if other photonic material platforms (other than SOI) are to be used which may have different nominal waveguide losses. Also, this design is benign with hetero integration strategies. Alongside the fabrication and sensitivity analysis of the OFFT, its individual components such as grating coupler, 2×2 (star) coupler, y branch, straight, and spiral waveguides and their characteristics were studied. The individuals' contribution to loss and power consumption of the entire system was incorporated to the on chip performance analysis. By doing a sensitivity analysis, the regions more suitable for operation of the OFFT and the temperature required to tune the phase, were identified. Also extra bends were provided for the MZI interferometer with different power outputs at each arm. The bends match the loss of one arm to the other.

BRIEF DESCRIPTION OF THE FIGURES

FIG. 1.1 is a Mach Zehnder Interferometer (MZI) basic schematic design representing the phase difference in the arms which is a function of length and wavelength;

FIG. 1.2 shows the design of a heating element located above the waveguide (no thermal under-cut);

FIG. 2.1(a) shows the OFFT structures according to a simplified all optical FFT used in the passive and active on chip device—this is based on the Differential Phase Shift Keying where the FFT operation is done by the changing the phase of the carrier with low power usage;

FIG. 2.1(b) shows another possible structure based on Quadrature Phase Shift Keying where the FFT operation is based on the change in the carrier phase in comparison to that of the output; this however needs to be done for both real and complex parts of the signal and as a result is more power consuming;

FIGS. 2.2(a)-(g) show an optical FFT on chip, where FIG. 2.2(a) shows an OFFT design with heaters on each arm, FIG. 2.2(b) shows an OFFT design with no heaters, FIG. 2.2(c) shows heaters only on the shorter arm (ideal OFFT design for the passive EBL fabrication), FIG. 2.2(d) shows an optical microscope image of an optical delay line test structure, FIG. 2.2(e) shows an optical microscope image of one arm of the MZI with heaters on, and FIGS. 2.2(f), (g) show the optical microscope image of the fabricated heater designs with bond pads;

FIG. 2.3 shows an OFFT N=4 used for the active design (no metal layers are shown in this image for illustrative purposes);

FIG. 2.4 shows a conventional Michelson interferometer modulator (MIM) schematic that is used here for sampling purposes on-chip;

FIG. 2.5(a) shows a p-i-n MIM and its depletion region and doping density;

FIG. 2.5(b) shows a p-i-n junction at 0 volt;

FIG. 2.5(c) is a schematic of the Michelson Interferometer modulator used on the active OFFT chip for sampling at 20 GHz;

FIG. 2.6(a) shows extra bends added to the top arm of the MZI's;

FIG. 2.6(b) is a zoomed out image of the MZI with additional bends on the top arm;

FIG. 2.6(c) shows an MZI with heater designs;

FIG. 2.7(a) shows an MZI 1st and 2nd stage partially demonstrated;

FIG. 2.7(b) shows additional bends on the 2nd stage of the MZI arm (similar to the previous cases);

FIG. 2.7(c) shows total active chip designs with two different OFFT structures (with and without sampling modulators), delay lines, waveguides, and couplers for test structures;

FIGS. 3.1(a)-(d) show Sensitivity Analysis Tests on the OFFT's first stage interferometer in terms of FIG. 3.1(a), phase sweep from $\pi/2 \pm \pi/2$ with increments of $\pi/100$; FIG. 3.1(b), time delay from 12.5±12.5 Ps (T/4±T/4) Ps with increments of 0.5 pico sec; FIG. 3.1(c), optical loss from 12.5±12.5 dB with increments of 0.5 dB (for the 1st stage MZI) and 6.25±6.25 dB with increments of 0.25 dB; and FIG. 3.1(d), physical changes for delay from 1.5±1.5 mm with increments of 0.06 mm corresponding to the same loss as mentioned in part c;

FIG. 3.2 shows OFFT geometry in the ideal case and outputs in binary format;

FIG. 3.3(a) shows Frequency Sensitivity Analysis on the transmission power (transfer function) of OFFT at ideal phase;

FIG. 3.3(b) shows Phase Sensitivity Analysis on the transmission power at probe frequency of 6.78 GHz;

FIG. 3.4(a) shows Degradation/Impairment generated as a function of phase sweep (difference in the transfer functions of the OFFT output in regards to the ideal case at 6.78 GHz) for −20 dB loss tolerance;

FIG. 3.4(b) is a figure of merit as a function of detuning phase at 6.78 GHz probe frequency—where $X_2$ has the ideal FOM while $X_3$ is minimal leakage from $X_3$ bin;

FIG. 3.5 is a physical sweep of length in the delay lines of the 1st stage MZI of the OFFT system;

FIG. 3.6 is a sweep of the passive and physical optical loss in the 1st and 2nd stages of the MZI of the OFFT system (loss was swept in both stages since otherwise the power mismatch would create meaningless result);

FIG. 3.7(a) shows the extinction ratio of the OFFT full system as a function of physical optical loss from the spiral waveguides (delay lines);

FIG. 3.7(b) is an analytical exponential fit (a) based on an ideal coupler.

FIG. 3.8 shows an analysis of the optical FFT shows up to three orders of magnitude more performance than a GPU (NVIDIA P100) for N<200 using a figure of merit of 1D FFT per second-Watt-Area assuming 0.9 dB insertion loss for couplers, 3.5 dB insertion loss for y-branches, 3.5 dB insertion loss for the modulator, 0.7 dB insertion loss for the first spiral, with linear scaling, photodetector power of 2.4 µW, and minimum optical power at the photodetector of 250 µW.

DETAILED DESCRIPTION OF THE PREFERRED EMBODIMENTS

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

The Optical FFT (OFFT) Design

One of the earliest uses for optics in computing was frequency domain filtering with Fourier Optics. In these systems, a lens is used to convert an image into the frequency domain where filtering can occur with the result being converted back into the spatial domain with a second lens. Even though such systems are highly parallel, they are also bulky because the lens requires a certain physical thickness.

In contrast, the OFFT on chip of the present invention has cascaded delayed interferometers and passive components such as directional (star) couplers, y branch, straight, and spiral waveguides shown in (FIG. 2.2(c)).

The Cooley-Tukey FFT requires two operations: addition and multiplication by a phase. The 2×2 optical coupler forms the principal addition equation of the OFFT, Eq. 1.

$$\beta_1 = \frac{1}{\sqrt{2}}(-\alpha_1 + \alpha_2)$$

$$\beta_2 = \frac{1}{\sqrt{2}}(\alpha_1 + \alpha_2)$$

(1)

Where $\beta_1$ and $\beta_2$ are the outputs and $\alpha_1$ and $\alpha_2$ are the outputs of the 2×2 coupler. The phase multiplication required by the Cooley-Tukey FFT can be implemented optically by phase difference, Eq. 2.

$$\in_{xy} = \exp(-i2\pi xy/N)$$ (2)

With these two components, the butterfly pattern of the Cooley-Tukey FFT can be built using only passive optics. Both addition and multiplication can be designed with integrated photonics as done here.

The optical input is achieved by coupling a laser signal from free space into the optical chip with a grating coupler. There are many advantages to an on-chip technology. One advantage is that everything (components, devices, and packaging) is smaller due to higher packaging density, i.e. no individual packaged components need to be connected. In addition, path lengths (where in bulk are a major source of latency) can be minimized and this may reduce the chip size and reduces latency. Integration on-chip allows to synergistically connect to electronic chips through CMOS technology and make 3D integration possible.

Most importantly it scales better with sample size, N. In the case of FFT, upscaling with N (number of samples) is challenging for processing units in bulk optics. The goal of the OFFT is to cascade smaller N circuits together and ideally make a computational device with N=1024. Doing so in fiber optics is implausible for many applications (i.e. cyber security control/processing units). In the present invention, the scalability is easier and we can cascade multiple N=4 or N=8 FFT's to achieve that goal. If larger FFTs are needed, a virtualization strategy can be provided using the smaller FFT shown here. Since the execution time required for this OFFT only depends on the time of flight, short times (for example from 0.1-100 picoseconds, though other suitable times are within the scope of the invention), are enabled by the millimeter small integrated photonics platform. The time is a function of the input frequency, as the modulation frequency of the input determines the propagation links. Unlike electronics, the higher the data rate on which to process the FFT, the smaller the chip, and thus faster the OFFT becomes. Such inverse scaling is a unique feature of the optical FFT.

FIG. 2.3 shows an OFFT active Design On Chip in a preview of the OFFT full system design in addition to the first stage MZI with spiral delay lines, grating coupler for input/output of the light, heaters with an 8 micron width, bond pads of 100 micron square in size and additional bends with an approximately close value to compensate for the loss difference in the lower arm.

The OFFT's system of cascaded delay interferometers includes Mach Zehnder Interferometers (MZI), such as the configuration shown in FIG. 1.1. It is important to note that phase plays a major role in interferometers. Each arm applies a phase change to the signal and at the output of the interferometer which come from the two paths that are joined together at the end. See "M. E. Marhic on "Discrete Fourier transforms by single-mode star networks." The following formula represents the phase on each arm of the interferometer as a function of physical length and wavelength of operation.

$$\phi_1 = 2\pi \frac{L}{\lambda}$$

FIG. 1.1 is a interferometer 100, such as a Mach Zehnder Interferometer (MZI), having a schematic design representing the phase difference in the arms 110, 120, which is a function of length and wavelength. It has an input 102, an output 104, a first delay device 112 having a first delay (i.e., phase change) $\phi_1$, and a second delay device 122 having a second delay $\phi_2$. The first and second delay devices 112, 122 are connected in parallel with each other between the input 102 and the output 104. Thus, the input terminal 102 is connected to a first input line 114 and a second input line 124. The first input line 114 is connected to an input of the first delay device 112, and the second input line 124 is connected to an input of the second delay device 122. An output of the first delay device 112 is connected to a first output line 116, and the output of the second delay device 122 is connected to a second output line 126. The first and second output lines 116, 126 are coupled together and are connected to the output line 104 for the MZI 100. As implemented in a traditional FFT, the input is for an optical signal and the transmission lines are optical wires that operate as waveguides. And other optical devices would be used, for example a coupling device might be provided at the junction of lines 114 and 124. The first input line 114, first delay device 112, and first output line 116 form the first arm 110 of the MZI 100. The second input line 122, second delay device 122 and second output line 124 form the second arm 120 of the MZI 100.

For the on-chip design of the present invention, the phase of the signal on each of the MZI arms is dependent on the length and for our OFFT configuration. Since the invention has a difference of length in the arms, we need to compensate for the phase difference in each arm. This is obtained by placing heating layers on top of the waveguide structures. This is done by resisitive heating and the thermo optic effect of silicon (applying voltage and current to the metallic pads), causing the propagation temperature to be modified through the refractive index change of silicon that consequently creates the change in phase—as needed based on the temperature. For instance, the second stage bottom MZI of FIG. 2.1 has a π/2 phase shift. This shows the calculation for the temperature change needed as a result of change in the refractive index.

$$\Delta \phi = \pi/2 = \frac{2\pi \frac{dn}{dT} \Delta T L}{\lambda}$$

$$\Delta n = \frac{dn}{dT} \Delta T$$

Accordingly, as used in the invention, the delay configuration can vary depending on the application. While each arm 110, 120 is shown having a respective delay device 112, 122, only one arm can have a delay device. And, the delay devices 112, 122 typically would have different delays φ2, φ2, though can also have the same delay. And, more than one delay device can be provided for each arm 110, 120.

Such a difference in the length of the MZI can also cause the loss in the arms 260, 270 (FIG. 2.2(c)) to be different, due to the Kramers-Kronig relations of the indices, the real part of the refractive index change, which also introduces an imaginary part (i.e. optical loss). This is because the longer arm potentially has a larger propagation constant and bending loss than the shorter one does, to avoid this power mismatch, additional bends (FIGS. 2.6, 2.7) have been designed and placed on the shorter arm 260 calculated accurately to match the power loss of the lower arm.

Silicon Photonics Design, Fabrication

The present invention includes the design, fabrication, and characterization of the OFFT chip. In the section we cover the simulations in Lumerical Interconnect which was done based on the designs demonstrated and how the results of these simulations helped us understand the performance of the optical chip.

The compatibility of silicon photonics integrated circuits with conventional CMOS fabrication technology is an important aspect that distinguishes silicon photonics from other optical material platforms such as III-V and lithium niobate. However, the requirements for fabricating silicon photonics based devices and multi-project wafers are complimentary with electronics devices. Some of the important factors taken into consideration while fabricating them includes: minimizing sidewall roughness to nanometer scale over a device length of several millimeters. This compatibility can be an important factor to take into consideration for mass production of the chip in the later stages. For instance, thermal shields can be provided on-chip to avoid the heaters from heating other areas of the chip, and the chip can have passivation.

The invention can utilize any suitable materials and fabrication. For example, the devices described in this section can be fabricated from a silicon photonic process such as offered by Applied Nanotools (for the passive design) and IMEC Singapore (Active design). See D. A. B. Miller, "Attojoule Optoelectronics for Low-Energy Information Processing and Communications," Jlt, vol. 35, pp. 346-396, Jan. 1, 2017.

OFFT Structure

Simple conventional all optical FFT has the advantage over others in terms of the number of Delay Interferometer (DI) it requires 2(N−1), where N is the number of stages, and the sampling gates at the end of the structure. As a result it performs with lower energy, phase adjustment gating, and therefore scales the incoming high speed optical signal well with the bitrate required (B/N)-lower speed tributary channels. This is similar to the structure of a differential phase shift keying (DPSK) where only the phase of the carrier is being changed. This Optical Fast Fourier Transform, Differential Phase Shift Keying is a less complicated and less power hungry structure in comparison to the quadrature phase shift keying (QPSK) where it is ambiguous whether the phase of the carrier is rotated by some angle—(the real and complex part of the signal (phase) are constantly being sampled and compared to the carrier wave at the input). The present invention can implement an integrated circuit for any suitable optical configuration. In one example embodiment, the invention can be used to implement the OFFT structures of FIGS. 2.1(a), (b). FIG. 2.2(c) and FIG. 2.3 are the passive and active integrated circuit (i.e., on-chip) configurations to implement the general schematic of FIG. 2.1(a) (which is a simplified all optical FFT 150). The OFFT is based on the Differential Phase Shift Keying where the FFT operation that changes the phase of the carrier with low power usage (i.e., <10 Watts). As shown, the OFFT 150 has a number of interferometers 100, such as MZIs, arranged in a cascading fashion. Each MZI 100 has a respective time delay and phase delay, though in some instances the time delay and/or phase shift can be zero. Couplers 154 are provided at the input and output of each MZI 100 to add and subtract optical signals. The OFFT 150 has a first stage at which a laser 152 provides an optical signal that passes through a first MZI 100, via input and output couplers 154. A second stage includes two MZIs 100 arranged in parallel with each other. The output from the first-stage MZI 100 is provided to the two second-stage MZIs 100, via the respective input couplers 154 shown. A splitter is provided at the output of the the MZI. Each second-stage MZI 100 outputs a signal through the respective output coupler 154, and is separated into two FFT outputs X0, X1, X2, X3 using y-branch/bidirectional couplers. The outputs X0, X1, X2, X3 are each then modulated by a modulated and detected by a photo detector. The photo detector measures and analyzes the optical signal by converting it into an electrical signal.

FIG. 2.2(a) shows another possible structure that can be implemented as an on-chip integrated circuit in accordance with the invention. FIG. 2.2(a) is based on Quadrature Phase Shift Keying where the FFT operation is based on the change in the carrier phase in comparison to that of the output. This however needs to be done for both real and complex parts of the signal and as a result is more power consuming.

Passive Design

In the present invention, SOI is used for passive designs (i.e., does not require power, so doesn't have a charge transfer or modulators) since silicon is the ideal material for integrated optical circuitry due to high refractive index and unique properties such as strong optical confinement (i.e., enhancement of Kerr non-linear process), low cost CMOS-compatible (i.e. easy to realize device designs, and well known fabrication techniques).

The OFFT photonic integrated circuit patterns with all passive components and heaters (which are active) for phase tunability was fabricated using the 1000 keV electron-beam lithography process at the NanoSOI fabrication lab of Applied NanoTools. The foundation of the process is the silicon patterning step, which is performed on SOI substrates. In the case of OFFT an extra oxide cladding was deposited for protection on the monochromatic wave propagating down the circuit.

To take advantage of the thermo-optic effects in silicon photonics, metallization and selective oxide release was performed to create the active components needed for tuning the refractive index of silicon as a function of temperature (resistive heating process). OFFT passive device substrate (9×9 mm) uses a silicon thickness of 220 nm with buffer oxide thickness of 2 μm and a substrate thickness of 675 μm. The patterning process is done by leaning and spin-coating a material that is sensitive to electron beam exposure. Then the OFFT design pattern was defined on the material using a 100 keV EBL. "Once the material has been chemically developed, an anisotropic ICP-RIE etching process is performed on the substrate to transfer the pattern into the underlying silicon layer. The etch is performed until there is no remaining silicon and the underlying buffer oxide layer is exposed." See Applied Nanotools, NanoSOI Fabrication Process (n.d.).

The invention includes two extra steps for the fabrication of the OFFT to get extra functionalities: as oxide deposition to protect and isolate silicon devices and metallization to give the devices electrical functionality and thermal tuning ability for the phase control.

OFFT Passive Design and Heaters:

FIG. 2.2 shows an optical FFT on chip in accordance with the present invention. FIG. 2.2(a) is an OFFT design with a heater 268 on each arm, where the heater 268 can be made in accordance with any suitable design, such as shown in FIG. 1.2. FIG. 2.2(b) is an OFFT design with no heaters. FIG. 2.2(c) is an OFFT design with heaters only on the shorter arm (ideal design). FIG. 2.2(d) is an optical microscope image of an optical delay line test structure. FIG. 2.2(e) is an optical microscope image of one arm of the MZI with heaters on the heater designs of FIGS. 2.2(f) and (g). Here, the first stage MZI has a 6 mm (total length) spiral waveguide for delay of 50 Ps operating at 10 GHz, the waveguide has a 0.5 micron width, and the heaters have an 8 micron width, bond pads of 100 micron square in size and additional bends with an approximately close value to compensate for the loss difference in the lower arm.

The OFFT passive design of FIG. 3.2 includes a number of components. The OFFT structure has N−2 stages of delayed interferometers and is based on the simple all optical FFT algorithm proposed by Hillerkuss 2. In the first stage there is only one interferometer with one arm with a delay of T/2 and in the second stage there are two interferometers. The structures in FIG. 2.2 include straight waveguides of different lengths (for measuring the propagation loss of both waveguide and the grating coupler), spiral waveguides (for creating delay in the interferometer's arms), y branch waveguides (for dividing the optical signal into two), and bidirectional (2×2) couplers (adiabatic and 3-dB for creating the desired phase shift and interference needed in the construction of the DFT from delayed interferometers). The design of each of these components were done by Lukas' Chrostowski group at UBC and for the present invention their design was used to implement the OFFT.

In the present invention, three different designs are discussed as illustrative non-limiting embodiments: OFFT with no heaters (FIG. 2.2(b)), OFFT with heaters on only one arm (FIG. 2.2(c)), and OFFT with heaters on both arms (FIG. 2.2(a)). For purposes of illustrating the invention, the non-limiting example embodiment of FIG. 2.2(c) is described here in more detail. As shown, the passive OFFT 200 has one or more interferometers 250a, 250b, 250c. Each interferometer 250 is an on-chip design for a Mach Zehnder Interferometer (MZI), and provides a phase difference in the arms 260, 270, which is a function of length and wavelength. The interferometer 250 implements an MZI, in on-chip design.

The MZI's 250a are the most impactful MZI at the first stage, and the other two MZIs 250b, c are for the second stage. It has an input 202, such as a laser signal from an external (not on-chip) laser, an output 204, a heater 268 formed between a first heater bond pad 262 and a second heater bond pad 263, and a delay device 272 having a delay φ. The MZI 250a represents the first stage MZI, the delay device 272 is the time delay needed for that MZI as shown in FIG. 3.2 (the spiral shows the T/2); of course there are phase shifts as a result of this delay in the waveguide but the goal is to get the delay the extra phase shift could be tuned using the heaters. The heater 268 is connected in parallel with the delay device 272 between the input 202 and the output 204. Thus, the input terminal 202 is connected to a first input line 264 and a second input line 274. The input is an optical signal, so the lines 202, 264, 274 are optical lines (i.e., waveguides). A splitter can be provided at the edge of the input 202 at the junction between lines 264 and 274. The first input line 264 is connected to an input of the heater 268. The second input line 274 is connected to an input of the delay device 272. The upper (or short) line 260 connects the two MZIs in the second stage. The heaters are only on one arm of the MZI's to compensate for the relative phase shift.

An output of the second heater 263 is connected to a first output line 266, and the output of the delay device 272 is connected to a second output line 276. The first and second output lines 266, 276 are coupled together and are connected to the output line 204 for the interferometer 250. A bidirectional coupler is located at the input of each MZI to get two inputs for the arms 260, 270. A coupler is located at line 264. In one embodiment, for example, line 274 is a grating coupler (for free-space (or fiber) to chip coupling), though any suitable device can be used such as butt-coupling or integrating the laser on-chip. The first input line 264, the heater 268 and the first output line 266 form the first arm 260 of the interferometer 250. The second input line 274, delay device 272 and second output line 276 form the second arm 270 of the interferometer 250.

Thus, the first arm 260 does not have any delay device, but has a heater 268 along the first arm 260. The heater 268 is used to control the phase of the optical signal on the first arm 260. The heater 268 can comprise any suitable heater configuration, for example the heater of FIG. 1.2 (which is used in an OFFT strip waveguide). As shown in FIG. 1.2, the heater 268 is a layer or coating that is applied on the top of the waveguide, such as on the top of the oxide layer. The material is Titanium Tungsten for the heater with high resistivity (so the heating could take place) and Aluminum routing layers for the bond pads 262, 263. The heater 268 provides uniform heating along its length. The Silicon layer operates as the waveguide, and the buried oxide layer is a shielding layer, though any suitable materials can be utilized. Of course, any suitable material and/or configuration can be provided for the heater, such as for example sapphire.

Applying heat to the Silicon on Insulator waveguides is a fine-tuning process using the thermo-optic effect in semiconductors, i.e. a change in temperature evokes a change in optical index which shifts the phase of a signal flowing through a waveguide; this is because one can use resistive heating (meaning applying voltage to the metallic heaters) on the active metal heater layers and cause a temperature change. This temperature change, varies the refractive index of material. For silicon this value is defined to be $1.84*10^{-4}$ per degrees Kelvin, and causes the phase change. In this case since we are using Titanium Tungsten (highly resistive), the resistivity in this metallic alloy causes heat and thus a refractive index change and consequently a phase change as desired.

However, note that the bond pads are Aluminum based—this is to have high conductivity in terms of transferring the heat to the metallic heaters. It is hard to obtain the difference in heat as we desire based on this equation, hence it is best to spread the components as far away as possible to make sure this heat is getting transferred uniformly to the desired waveguides and not the entire chip. Isolated temperature chambers could be useful for measurement purposes (one can place the chip in those and then apply heat only in certain areas), or using a different material for the waveguides in the heater area can be another useful tip for better phase control. Materials that are not resilient to temperature change could be used instead for the sections where heaters are applied (Sapphire or Aluminum Oxide are as such).

The second arm 270 has a spiral 272 for a delay device. The spiral 272 is described with respect to FIG. 2.5(a) below. In one embodiment of the invention, the delay device 272 can be a spiral with a length of 6 mm=T/2=50 Ps, though any suitable size and shape can be provided. The bond pads 262, 263 have a fixed size due to the probes that are used later for measurements. Here they are 10×10 microns, but the bigger the MZI the length of the heater might be larger for uniform phase detuning. The pads 262, 263 can connect to power to provide voltage and ground, so that the heater 268 is a tunable heater. Of course, bond pads need not be provided, but instead integrated power lines can be used to connect the heater 268 to the power source. In addition, FIG. 2.2(a) shows the use of a heater 278 having a spiral configuration that matches (or is slightly larger than) the size and shape of the spiral 272. The heater 278 can be a curved line in the shape of a spiral that only extends over the waveguide of the spiral 272, or can be a filled (closed) circle that lays over the top of the spiral 272. The spiral heater 278 extends over the top of the spiral 272 (having the same cross-section as shown in FIG. 1.2). Bond pads 279 are shown connected at either end of the heater 278 to connect the heater 278 to a power supply, though the spiral heater 278 can be directly connected to a power supply without bond pads 279. The spiral heater 278 can be used in addition to or instead of the heater 268 on the first arm 260. Returning to FIG. 2.2(c), the second and third interferometers 250b, 250c are connected in parallel with each other, and the first interferometer 250a is connected in series with the second and third interferometers 250b, 250c. The first interferometer 250a forms a first stage of the OFFT 200, and the second and third interferometers 250b, 250c together form the second stage of the OFFT 200. The interferometers 250a, b, c can all have the same size spiral 272 to achieve a same delay, or can have different size spirals 272. The heater 268 is configured to match the spirals 272, so the larger the spiral 272, the larger the heater 268.

The output 204 is a bidirectional coupler that divides and recombines the signal into two outputs for the second stage MZIs 250b, c. One output is coupled directly to the input 202 of the second MZI 250b, and the other output is coupled to the connecting line 206, which can be a waveguide and connects the output 204 to the third MZI 250c in the second stage.

Thus, the output 204 from the first interferometer 250a is connected to the input 202 of the second and third interferometers 250b, 250c. For example, the output 204 of the first interferometer 250a can be transmitted over line 206 to the inputs 202 of the second and third interferometers 250b, 250c. The output from 266 and 276 are coupled together (i.e., addition and subtraction operations of the signal amplitudes) by the coupler 204. The output from the coupler 204 is provided to the input of both of the second stage interferometers 250b, 250c, depending on the phase sensitive splitting ratio, so that a part of each signal 266, 276 goes to the interferometers 250b, 250c.

In order to do the FFT operation, the OFFT 200 creates phase delay to perform the mathematical operations, namely addition for in-phase signals and subtractions for out-of-phase signals on the optical signal (the output of 266 and 276). Thus, the optical signal outputs 266, 276 are recombined through a directional coupler 204 which creates additional phase shifts. The arms of the directional coupler are Pi phase shifted but Pi/2 in the crossed arms, which performs the math. The coupler 204 also creates equal power signals, which get split into the two outputs that go to the second and third interferometers 250b, 250c at the second stage, respectively. There, based on the Cooley Tukey algorithm, a relative phase shift is given in the bottom MZI 250c (Pi/2) in the second stage. This is achieved by applying the heater and creating a 0.54 degrees Kelvin temperature change. Note that the other two MZI's 250a, 250b do not have different phase between their arms, but because of the optical delay lines, additional phase shift is automatically created. This is not shown clearly in FIG. 3.2 but to make sure that the relative phase between the first stage MZI 250a and the top MZI 250b is 0, we again apply the heaters, to ensure that.

Once the signals pass through the second and third interferometers 250b, 250c, they provide respective outputs 212 from the couplers 208, 210. The signal gets divided into 4 outputs (N=4) and can be modulated externally for sampling and measurement. Here in the passive design the sampling is done off chip. Accordingly, the OFFT 200 of FIG. 2.2(c) has only one heater 268 per MZI 250a, 250b, 250c for relative phase shifts needed. In addition, added bends can be provided.

The general operation of the temporal photonic integrated on-chip passive device 200 of FIG. 2.2(c) and active device of FIG. 2.3, will be described. An optical signal is received at the input 202. The optical signal can be, for example, a serial analog optical signal from an external or internal light source (e.g., laser). The optical signal gets passed from the input 202 onto the passive waveguide 264 and also to a grating coupler (if the signal is coming from free space), line 270. The grating coupler 270 couples the optical signal to the spiral 272, which causes a temporal (time) offset of T/2 but zero phase shift (see FIG. 2.1(a)), where T is the frequency of the input optical signal. The spirals play the role of physical time delay in the system, this is to create a temporal (i.e. in time) signals that are shifted in time (parallel samples) so that their frequencies could be filtered out at the output of the FFT. Thus, the spiral has an output 276 that is an offset or delayed optical signal.

At the same time, the passive waveguide 264 has a portion that comprises the heater 268, which is controlled by controlling the voltage passing across the power lines at 262, 263. The heater 268 also creates a phase offset of T/4, where T is the time period of the input signal 202. The output of the interferometer is very phase sensitive and the heating elements are essential for obtaining a well-tuned FFT (filtering frequency). That is, the heater 268 aligns the phase of the optical signal in the passive waveguide 264 with the phase of the optical signal passing through the spiral waveguide 272. The arms have to have the same phase for the first stage MZI 250a in the first stage and the second MZI 250b in the second stage. The third MZI 250c of the second stage must have a phase change of Pi/2—ideally speaking to create a 0.54 K temperature change, but due to fabrication these values might not be exact for example this 0.54 K might be increased because the phase change between the arms of the second stage MZI might be already more or less than Pi/2 hence one has to do a careful measurement to be able to apply heater for the phase tuning.

Accordingly, the signal at the passive waveguide output 266 has phase correlation with the signal at the spiral output 276. In addition, bends can be provided on the shorter arm 260, such as shown for the bends 362 for the active design of FIGS. 2.3, 2.6. The spiral waveguide 272 is longer than the first arm 260, which results in an optical power loss for the signal passing through the spiral waveguide 272 compared to the optical signal passing through the passive waveguide 202. The bends cause a similar optical power loss on the first arm 260, so that the optical power loss on the first arm 260 is substantially the same as the power loss on the second arm 270.

The signals on outputs 266, 276 then pass through the coupler 204, which combines those signals. To avoid the waveguide crossings and due to the symmetry of the structure the optical FFT can be designed in any suitable manner such as in cascaded MZI's or delayed interferometers, also called the butterfly method. The number of stages is a function of FFT points and the size of the MZI's is reduced by a factor of 2 in each stage accordingly. If N is the number of the FFT points, then we have N−1 cascaded MZI's or delayed interferometers, with complexity of 2(N−1): this is the number of delay lines and is the number of MZI arms, in our case it is 6. [are these formulas correct?] And the number of bidirectional coupler is determined by N−1+(N/2)log_2 (N). The frequency response of the FFT is determined based on the frequency of the input signal which determines the time delay in the system. Angular frequency=2Pi/T_delay where in different stages of the FFT this is decreased to T/2 and T/4 accordingly for an N=4.

The coupled signals represent an addition/subtraction mathematical operation of those output signals 266, 276 that is part of the FFT calculation. That is, if the signals 266, 276 are in phase with each other, then they get added and if they are not in phase with each other they get subtracted. The spiral 272 and the layer underneath the heater 268 have to be in phase but physically speaking when we fabricate these chips due to the long spiral waveguide, phase delay is created—this additional unwanted phase delay is compensated and tuned out using the heater (i.e., the heater aligns the phases). The spiral waveguides also save space on the chip and create a delay structure physically. The phase shift that is created as a result of the coupler 204 combining these optical signals represents the discrete Fourier transform of the signal. The signals with different time delay say 50 pico seconds are added together—ideally they are in phase, and the coupler creates a phase shift of Pi such that these two signals are subtracted from each other and with their amplitude divided in half (equal in power but different in phase) go to the second stage MZI's 250b, 250c.

The output from the coupler 204 is the output from the first stage interferometer 250a. The coupler 204 is a 2×2 coupler, which means that there are two input signals and two output signals. So the output from the coupler 204 is divided into two parts with different time delays. One part is received at the second interferometer 250b, and the other part is received at the third interferometer 250c. Each of those interferometers 250b, 250c, performs a similar operation as the first interferometer 250a. At the second stage, however, the second interferometers 250b has a time delay of T/4 and a phase shift of zero, and the third interferometer has a time delay of T/4 and a phase shift of π/2, as shown in FIG. 2.1(a). The physical length creates phase shift in the signals, and the heaters tune the unwanted phase.

The 2×2 couplers 208, 210 divide the signal into four outputs 212. More specifically, the couplers 204, 208, 210 divides the input signal to the different frequencies it entails (FIG. 3.3(a)) and that is how the FFT is performed for N=4. Those output signals 212 are an optical power signal that is phase sensitive. The system 200 is an N=4, which means that there is a single input 202, and four outputs 212, each containing one spectral filter of information (i.e., the incoming signal has a spectrum of frequencies, so for example 212 filters one of those frequencies out). Those output signals 212 represent the FFT function, where the FFT is an integral that is expressed photonically with phase-sensitive devices. The output signals 212 can then be modulated for analysis, for example by the modulators 380 (FIGS. 2.3, 4 and 5) receiving outputs from the couplers 308, 310. In addition, sampling and detectors 290 can be provided on-chip, as shown in FIG. 2.1(b).

The OFFT with no heater (FIG. 2.2(b)) can be useful in environments with very stable temperature. But fabrication of optical chips for precise measurements such as the phase is not reliable enough, heaters can be used to compensate. These unreliabilities come from material selection and processing conditions, wafer dicing, bonding techniques, and certain methods that are specific to the foundries fabricating optical chips. Hence for the other designs (FIGS. 2.2(a), (c)), heaters 268, 278 are provided to compensate in case such issues fail to address the interference needed to create a DFT based network of couplers. To give more flexibility for tuning the OFFT, there were heaters on each arm: one on the straight waveguide and the other in a spiral form. Every metallic heater is connected to bond pads of 100 micron squared for conducting electrical power. For the longer arm (spiral shaped), the heaters were also designed with a spiral geometry to cover as much area as possible.

In one example embodiment of the invention, each of the waveguides (including 202, 264, 274, 266, 276, 204) can have a width of 0.5 μm, and the heater 268 width can be 8 μm. That enables the heater 268 to carry about twice the level of current and the resistance will be about half the previous value; so since $P=I^2 \times R$ the heaters will dissipate more power. This is because the larger trace will use up more energy. We provided up to more than 20 volts of power, which can be done with an 8 μm heater. Safe current to run through a heater is around 20-25 mA, maximum requirement for heat power is around 35-40 mW. The heater width could range around 4-8 micrometer. Of course, any suitable sizes can be provided depending on the particular application. Hence since the phase is only a relative quantity between the two arms 260, 270 of the interferometers 250, the design of FIG. 2.2(c) is best suited to most applications. FIGS. 2.2(d), (g) show the fabricated chip with an optical microscope.

To be able to measure the optical chip the system frequency was set to be at 10 GHz, so that for the sampling purposes our optical measurement devices (oscilloscopes) could detect and sample the signal with twice as big as the system frequency (Nyquist Limit). Other suitable modulation speeds can be utilized, for example 100 GHz. From the system frequency, the delay in the system is determined by the following calculation:

Assume the sampling frequency is at $f_{sampling}$=10 GHz where the effective index is:

$n_{eff}$=2.5

So the time delay becomes:

$$T_{Delay} = 1/f_{sampling} = 10^{-10} \text{ s}$$

$$d_{10} = \frac{c}{n} \times T_{Delay} = 12 \text{ mm}$$

If ideally we modulate the system at a faster rate for instance $f_{sampling}$=100 GHz then the time delay and the physical length become:

$$T_{Delay} = 1/f_{sampling} = 10^{-11} \text{ s}$$

$$d_{100} = \frac{c}{n} \times T_{Delay} = 1.2 \text{ mm}$$

where $d_{100}$ is the length of the spirals for the 100 GHz sampling rate, $f_{sampling}$ is the sampling frequency (how fast we collect samples in time for a meaningful output data.

Given the equation above, the spirals 272 for the first MZI 250*a* with T/2 have a length of 6 mm and the spirals 272 for the second and third MZIs 250*b*, 250*c* with T/4 have a length of 3 mm.

Thus, the length of the second arm 270 for the first MZI 250*a* is longer than the length of the second arm 270 for the second and third MZIs 250*b*, 250*c*. The length of the shorter arms 260 of the MZI 250 for the first stage is 500 µm and for the second stage is 440 µm. Thus to create the relative π/2 phase shift in the 2$^{nd}$ stage of the MZI we can use the following calculation:

Given that $n_{eff}$=2.5 and that $$\left(\frac{dn_{eff}}{dT} \approx \frac{dn}{dT}\right) \text{ and } \frac{dn}{dT} = 1.86 \times 10^{-4} \text{K}^{-1}$$

and using equation (1.1) below we can solve for the change in temperature required.

$$\Delta\phi = \pi/2 = \frac{2\pi \frac{dn}{dT} \Delta TL}{\lambda} \quad (1.1)$$

Solving for delta T:

$$\Delta T = \frac{(\pi/2) \times \lambda}{2\pi \frac{dn}{dT} L}$$

While in principal an OFFT network could be created with perfect phase alignment, in practice active phase calibration at a specific temperature is required to compensate for fabrication variance. This phase calibration was accomplished with a heating element placed along on one of the waveguide paths of the cascaded interferometers. The heaters are present in both figures so it is all good.

The temperature changes the index of refraction which also changes the phase. When the chips are fabricated, there might be some defects and imperfections so the tuning of phase is important to control the FFT operation. The OFFT is completely operated and sensitive to phase. For the second MZI 250 with L=500 µm the temperature change required is as follows:

$$\Delta T_2 = \frac{(\pi/2) \times \lambda}{2\pi \frac{dn}{dT} L} = 4.17 \text{K}$$

However, this small temperature change is very hard to achieve in room temperature around 300 degrees Kelvin. The best way to do this is to place the optical chip in an ambient chamber with temperature isolation to be able to achieve the desired phase shift. Another approach could come from modulating the system at a faster system frequency so the length difference is smaller and so the temperature change could be larger and easier to achieve. It is important to note that once part of the chip is heated up the entire chip is raised to that certain temperature. This brings a lot of complexity in terms of controlling the phase due to the unwanted heat, thus in the future for the measurement purposes of the chip, taking advantage of the knowledge from CMOS technology, a theoretical study and analysis can be done on the conductivity of the oxide layers used in the design of the OFFT and seek possibilities in controlling the temperature through varying the oxide layers on different parts of the chip.

The minimum radius of the spiral waveguides 272 is 50 µm with 20 µm spacing. Note that the area of the largest spiral is 3941.13 µm squared=0.00394 mm squared.

FIG. 2.2(c) shows the ideal OFFT 200 design used for the passive EBL fabrication. And the total area of the OFFT with N=4 is 12199.391 µm squared=0.012 mm squared. Given the calculated group index of silicon for the OFFT $n_g$=1.7 and $\Delta L_1$=6 mm−500 µm=5.5 mm and $\Delta L_2$=3 mm−440 µm=2.56 mm, the free spectral range in Hz and meters are as follows:

For $\Delta L_1$:

$$FSR = \frac{c}{n_g \Delta L_1} = \frac{3 \times 10^8}{1.7 \times (5.5 \times 10^{-3})} = 32.1 \text{ GHz}$$

$$FSR = \frac{\lambda^2}{n_g \Delta L_1} = \frac{(1550 \times 10^{-9})^2}{1.7 \times (5.5 \times 10^{-3})} = 0.26 \text{ nm}$$

For $\Delta L_2$:

$$FSR = \frac{c}{n_g \Delta L_2} = \frac{3 \times 10^8}{1.7 \times (2.56 \times 10^{-3})} = 69.3 \text{ GHz}$$

$$FSR = \frac{\lambda^2}{n_g \Delta L_2} = \frac{(1550 \times 10^{-9})^2}{1.7 \times (2.56 \times 10^{-3})} = 0.51 \text{ nm}$$

In the simplified DFT since it acts as a periodic filter in the frequency domain, the FSR can be calculated by $$FSR_{SimplifiedFFT} = \frac{N\Delta\omega}{2^p}$$

where p is the index of the FFT stage and N is the order of the FFT. In the case of N=4 FFT, the FSR for the 1$^{st}$ stage and 2$^{nd}$ stage can be calculated as follows:

$$FSR_{SimplifiedFFT1st} = \frac{N\Delta\omega}{2^p} = \frac{4 \times 10 \times 10^9}{2} = 20 \text{ GHz}$$

$$FSR_{SimplifiedFFT2nd} = \frac{N\Delta\omega}{2^p} = \frac{4 \times 10 \times 10^9}{2^2} = 10 \text{ GHz}$$

Another point in the design of the passive OFFT is that the optical source and sampling can be done externally (or internally in other embodiments) using a tunable laser and spectrum analyzer (BERT). The modulation is done after you couple the light out of the chip to free space using the grating couplers at the end of the chip. The grating coupler 208 outputs the light to free space from the chip and there are 4 similar outputs because we are using an N=4 FFT. This was to make the design simple enough so a better understanding on the performance of the DFT was obtained. Sampling is an important stage in performing the discrete Fourier transform when testing analog continuous signals (e.g., ADC convertors)—in this case a monochromatic optical wave. A pure sine wave test signal is generated at such a frequency that the input signal goes through a whole number of cycles during the sampling period (a certain frequency increment, anything before or after that would be considered a spectral leakage).

Active Design

The integration of silicon photonics on chip with electro-optic materials (active) brings novelty to the technology in terms of taking advantage of the electronic, and photonic properties. Electro-optic materials allow electrical and optical signals to talk to each other by optically changing the propagation constant of the optical mode in an Electro Optical Modulator (EOM). This is usually done by using a low frequency electric field to do the perturbation of the electron distribution. This perturbation also alters the group index of wave passing through the material (since photonics and the electric field interact with the perturbed charge distribution). Hence, the refractive index of such electro-optic materials are voltage-controlled. Using this physical phenomena electro-optic devices can be designed and fabricated. Earlier we discussed using metallization in the passive design for the control of the phase of the monochromatic optical wave—note that this is done also by taking advantage of the electro-optic effect: by slowing light down in one arm of the Mach Zehnder Interferometer, the phase and the interference of the light can be controlled through the voltage and refractive index relationship. See Hillerkuss 3; Sehmi, A. (n.d.). Fourier series and the discrete Fourier transform. Digital Signal Processing: principles, devices and applications, 43-64. doi:10.1049/pbce042e_ch5.

Electro-optic devices can be designed to modulate various properties of a light wave other than its phase, such as polarization, amplitude, frequency, and its direction of propagation. Using different materials in the device geometries, the carrier concentration and doping can be altered yielding the desirable device performance. In the case of the OFFT, the active design not only uses the thermo-optic effect for phase tuning but also uses on-chip modulation for sampling and modulating the input monochromatic wave using a Michelson EOM for its easy implementation. See Sanjoh, H., Yamada, E., & Yoshikuni, Y. (n.d.), Optical orthogonal frequency division multiplexing using frequency/time domain filtering for high spectral efficiency up to 1 bit/s/Hz. Optical Fiber Communication Conference and Exhibit, doi:10.1109/ofc.2002.1036444; M. L. Dakes, "Grating Coupler for Efficient Excitation of Optical Guided Waves in Thin Films," Applied Physics Letters, vol. 16, no. 12, pp. 523-525, June 1970; V. Nguyen et al., "Silicon-based highly-efficient fiber-to-waveguide coupler for high index contrast systems," Applied Physics Letters, vol. 88, February 2006; J. H. Harris et al., "Theory and Design of Periodic Couplers," Applied Optics, vol. 11, no. 10, pp. 2234-2241, October 1972.

OFFT Active Design:

The design of the active OFFT is similar to that of the passive one (FIG. 2.2) with a few modifications. The active OFFT includes a MIM for modulation on chip. As shown in FIGS. 2.1(a), (b) the photodetectors can be on chip too, which are other active elements. For simplification and testing the functionality of the OFFT, the sampling can be done externally using a BER tester and the laser can be off chip and used as a source for the present device via grating couplers. To make this more compact and the integration even denser, the sampling was designed to be done on chip in any suitable manner, such as in Patel, D., Veerasubramanian, V., Ghosh, S., Samani, A., Zhong, Q., & Plant, D. V. (2014), High-speed compact silicon photonic Michelson interferometric modulator, Optics Express, 22(22), 26788. doi:10.1364/oe.22.026788. The area of the new design with sampling modulators is now 19137.48037 µm$^2$=0.019 mm$^2$.

FIG. 2.3 shows an OFFT N=4 used for the active design (no metal layers are present in this image). The sampling modulators are placed at the end of the last stage of OFFT couplers since their location will not change the overall performance and due to the simplified method, for reducing the waveguide crossings, the sampling gates are best placed at the end of the OFFT. This is for synchronous sampling the signal at the output and obtaining the different frequency components. The modulator here is based on the Michelson interferometer modulator (MIM) normally used for sampling optical signals—where light travels through the phase shifting region twice when compared to MZI's due to the presence of loop mirrors at the one end of the modulator. Michelson modulators in comparison to MZI's have shown half $v_\pi L_\pi$, when operated in DC voltages. This is especially rewarding in optical circuitry for minimizing the power usage while transmitting optical waves. More specific design details of the MIM modulator can be found in Appendix C of the priority provisional application.

In more detail of an example of the invention, an active OFFT 300 is shown in FIG. 2.3. The OFFT 300 has a first stage with a first interferometer 350a and a second stage with a second and third interferometer 350b, 350c. The first interferometer 350a has a first arm 360 and a second arm 370. The first arm 360 can have added bends 400 for power equalization between the first arm 360 and the second arm 370. The second arm 370 has a spiral 372 that creates a phase delay. Though the interferometer is not shown having heaters, it should be appreciated that heaters can be provided on the first arm 360 and/or second arm 370 or elsewhere in the OFFT 300. The second interferometers 350b, 350c are shown without extra bends, but it will be appreciated that added bends can be provided on the second arm 370 or elsewhere in the OFFT 300.

A modulator 380 is provided at the output 308, 310 of each of the second and third interferometers 350b, 350c. The modulator 380 can be any suitable modulator, such as the Michelson interferometer modulator (MIM) 380 shown in FIG. 2.4, see Patel et al., or the p-i-n MIM of FIG. 2.5. FIG. 2.5(a) shows a p-i-n MIM and its depletion region and doping density, FIG. 2.5(b) shows a p-i-n junction at 0 volt, and FIG. 2.5(c) is a schematic of the Michelson Interferometer modulator used on the active OFFT chip for sampling at 20 GHz. See Hillerkuss 2. The MIM 380 is an electro-optic modulator that is used to sample the transfer function at the output ports. However, any suitable output modulator can be utilized.

Additional Bends

The spirals bring more loss to the second arm, the longer the waveguide the more propagation loss it has. That causes a phase change, but it can be compensated with the heaters. The shape and the bends are located on the shorter arm so the loss in them is increased. The heaters can be placed anywhere on the arm of the MZI, but we assign 260 as the shorter arm. In the design of the passive OFFT based on the different test structures done by Applied Nanotools we determined the total optical loss coming from the straight and bent waveguides. However the foundry that the active chip was fabricated was different, but to avoid the power mismatch loss additional bends were placed on the shorter arm of the cascaded MZI's to compensate for the power loss at the output of the couplers. The loss were measured as following:

490 dB/m×6 mm(Longer Arm–1st stage–272)=2.94 dB 490 dB/m×3 mm(Longer Arm–2nd stage–250a&b) =1.47 dB And the loss already from the straight waveguides with no bending equals:

150 dB/m×500 um(Shorter Arm–1st stage–260a) =0.075 dB 150 dB/m×440 um(Shorter Arm–2nd stage–260c) =0.066 dB So the additional loss added (arbitrary values—not exact):

2.94 dB–0.075 dB=2.865 dB 1.47 dB×0.066 dB=1.404 dB

Note that each of those sharp bends is approximately around 0.48 dB and so the above values needed for loss given our design would not be exact, but a close estimation. If necessary using the heaters, some of the other power mismatch could be created with the phase changing in the shorter arm.

FIG. 2.6(a) shows extra bends 400 added to the top arm of the MZI's, The bends can be slightly curved square-shaped U-shaped bends. One or more bends can be provided, and each bend can be inversely formed with respect to its neighboring bend to form a sinusoidal-shaped pattern. Thus, as illustrated by the calculations above, the number of bends depend on the loss imbalance between the two arms of the MZI, though for a stable process they would not change. The bends are different for the bigger MZI in comparison to the smaller MZI. For the larger MZI where there is a bigger spiral and hence bigger loss the bends have sharper edges. The same for the smaller MZI's; the same number of bends (6) but the sharpness is less, which is significant for nanofabrication. The sharper the edge of your waveguide the lossier it is. FIG. 2.6(b) shows zoomed out image of the MZI with additional bends on the top arm, and FIG. 2.6(c) shows MZI with heater designs, where the waveguide below the heating layer has several bends. In one embodiment, there can be approximately 4-10 bends, depending on the foundry numbers for loss per bend in waveguides. And the angle can be close to 90 degrees (a very sharp bend for the bigger MZI where more loss was needed on the top arm), but for the smaller MZI's can have a bend of 75 degrees. Of course, any suitable number of bends can be provided, more or less than 4-10 bends, and any suitable angle can be provided, more or less than 75-90 degrees.

The chip along with many designs—such as multiple OFFT systems with and without the MIM modulator, delay test lines, and waveguides with different lengths—were fabricated using a commercially available process at the Institute of Microelectronics (IME) A*STAR (Singapore) on an SOI wafer with a 2 µm buried oxide (BOX) layer and a 220-nm thick top-silicon. This was through the Active Silicon Photonics workshop offered by the Canadian Microelectronics Corporations. This process had a single 2-µm thick aluminum interconnect metal layer, aluminum vias, and non-silicide contacts for powering the heaters and the connectors for the modulators. See Miller; George, J., Nejadriahi, H., & Sorger, V. J. (2017). Towards On-Chip Optical FFTs for Convolutional Neural Networks. IEEE Rebooting in Computing, 1-5.

FIG. 2.7(a) shows MZI first and second stage partially demonstrated, FIG. 2.7(b) shows additional bends 400 on the second stage of the MZI arm (similar to the previous cases), and FIG. 2.7(c) shows total active chip designs with two different OFFT structures (with and without sampling modulators), delay lines, waveguides, and couplers for test structures. In FIG. 2.7, the entire active chip is shown with all the structures on it. The bends are for power matching of the MZI arms. Due to the propagation loss of spiral/bent waveguides, these extra bends were added so the power mismatch that is created due to the spiral delay lines can be compensated on the shorter arms.

Power Consumption

In order to find the total optical loss contributions from the OFFT system of delayed interferometers, it is critical to find the total physical length along with the loss per unit length. First we start calculating the passive components lengths (waveguides, coupler, phase shifters) and losses at 10 GHz (see Appendix C of the priority provisional application):

Optical loss for waveguides with a TE mode: Straight: –1.5 dB/cm, Spiral: –4.9 dB/cm (App. C)

Total Straight WG Length: 6.607 mm: 0.6607 cm

Loss: –0.99105 dB

Total Spiral WG length: 12.2 mm: 1.22 cm

Loss: –5.978 dB

At 100 GHz:

Optical loss for waveguides with a TE mode: Straight: –1.5 dB/cm, Spiral: –4.9 dB/cm Total Straight WG Length: 0.661 mm: 0.0661 cm Loss: –0.099 dB Total Spiral WG length: 1.4 mm: 0.14 cm Loss: –0.686 dB Now for the active parts, in order to find the minimum power needed for the laser to generate a signal above the noise level, we need to calculate the power needed to detect the lowest optical signal—this is assuming that we use the photodetector structure, referring to Table 1:

TABLE 1

| | | |
|---|---|---|
| Ge photodiode low-speed | OE bandwidth @ −1 V | >1 GHz |
| | Responsivity @ 1550 nm, −1 V | 0.7 A/W |
| | Dark current @ −1 V, 20° C. | <50 nA |
| Ge photodiode medium-speed | OE bandwidth @ −1 V | 20 GHz |
| | Responsivity @ 1550 nm, −1 V | 0.6 A/W |
| | Dark current @ −1 V, 20° C. | <50 nA |
| Ge photodiode high-speed | OE bandwidth @ −1 V | >50 GHz |
| | Responsivity @ 1550 nm, −1 V | 0.5 A/W |
| | Dark current @ −1 V, 20° C. | <50 nA |

For the entire OFFT System (Optical Fast Fourier Transform) designs, power calculation (Input/optical source, Operating segment, and output/detection)−(1000×is to compensate for the 30 dB or 0.001 power drop)

$$P_{minLaser} = \frac{50 \ [nA]}{0.6 \ [A/W]} \times 1000 \cong 100 \ [\mu W]$$

To be safe (10×higher than the minimum power required).

100 [μW]×10=1 [mW]=0 [dBm]

Compared to the power usage from the ADC and DAC converters, the minimum power required by the laser is relatively low. However improving photodetector's responsivitiy value, can decrease this power usage required by the laser even further.

The total power usage for the OFFT structure as a result of the above calculations and analysis is the sum of the electrical power and the optical power and can be estimated as:

$P_{OFFT-Operation} = El + Opt = 4.5 \ W + 0.001 \ W \sim 4.5 \ W$

Since the OFFT structure is based on the N=4 simplified FFT algorithm, thus the total optical loss is estimated to be as shown in Table 2 below:

TABLE 2

Optical Loss calculation for OFFT structure with simplified algorithm for N = 4.

| Description | Assumption |
|---|---|
| Optical loss from spiral WG | 6 dB |
| Optical loss from spiral WG | 1 dB |
| Optical loss modulators (sampling) | 3.5 dB |
| Optical loss 2 × 2 | 3 dB |
| Optical loss splitter | 9 dB |
| Optical loss input grating coupler | 4 dB |
| Total Optical Loss | 26.5 dB |

Speed Calculation—Time of Flight

In practice, optical FFT allows signal processing at a record aggregated bit-rate with very little power consumption, and it rescales the bit-rate of an incoming signal to lower-speed B of an incoming high speed signal (optically) to smaller channels having a bit-rate of B/N. It is important to understand and know how fast the bit propagates inside a tributary channel of OFFT. See Ch. 3:12 of priority provisional application. To calculate the propagation speed for a signal passing though the OFFT circuit, the total length of the waveguides are calculated along with the effective refractive index to determine the speed of light passing through the material structure. This speed is the data bit-rate and it shows the value for a single tributary channel, and can be used in a 100× channel WDM for TBit (100 channels) transmission processing. The values shows to be 156.73 ps. This propagation rate can be increased by increasing the system modulation frequency. Ideally speaking a value of 100 GHz is what this system was originally planned to be based on, but due to the lack of on chip modulators able to perform at that speed, a more reasonable value was chosen (10 GHz). This however is still a relatively fast operational speed in comparison to the electrical examples that operate in the order 1-10 nanosecond. Feng, D., Qian, W., Liang, H., Kung, C., Zhou, Z., Li, Z., . . . Asghari, M. (2013), High-Speed GeSi Electroabsorption Modulator on the SOI Waveguide Platform. IEEE Journal of Selected Topics in Quantum Electronics, 19(6), 64-73, doi:10.1109/jstqe.2013.2278881

$$\text{Speed} = T_{Delay} = \frac{\sum Length_{Total}}{\text{Velocity}} = \frac{\sum L_{Total}}{c/n_{eff}}$$

$$\sum L_{Total} = 18807 \ [\mu m] = 0.018807 \ [m]$$

Where $c = 3 \times 10^8$ m/s $n_{eff} = 2.5$ Obtained from Lumerical Mode Solution.

Speed =

$$\frac{\sum L_{Total}}{c/n_{eff}} = \frac{0.018807 \ [m]}{(3 \times 10^8)/2.5 \ [m/s]} = 1.56725 \times 10^{-10} \ [s] = 156.73 \ [ps]$$

Depending on the modulation format, the number of bits that can be propagated using the OFFT can differ. Some examples are shown in the Table 3 below to show the capability of high bandwidth data transmittance of the OFFT which ranges from 100's of GHz to THz:

TABLE 3

Modulation formats and data transmission rate for a N = 4 OFFT

| Mod Format | OOK | DPSK | QAM |
|---|---|---|---|
| Speed | 40 GHz | 92 GHz | 256 GHz |
| Bitrate for single OFFT channel at 10 GHz | 400 GHZ | 920 GHz | 2.56 THz |
| Bitrate for 4 channels at 10 GHz | 1.6 THz | 3.68 THz | 10.24 THz |

Taking advantage of the OFFT technology for OFDM data processing with multiple channels of data, the transmission rate can be increased even further to the PHz order of magnitude. See Wang, Z., Kravtsov, K. S., Huang, Y., & Prucnal, P. R. (2011), Optical FFT/IFFT circuit realization using arrayed waveguide gratings and the applications in all-optical OFDM system, Optics Express, 19(5), 4501, doi:10.1364/oe.19.004501.

Sensitivity Analysis

In the design of any system (optical/electrical circuit), it is important to understand and know the exact effect on the system performance due to variations of system parameters.

In the case of optical circuits with mostly passive components, effects of device length (system delay), phase, and optical (power) loss can be expressed in terms of the sensitivity function. This is due to the inefficiency in tape-out/post tape-out effects and specifications—hence a sweep of parameters and the determination of a nominal parameter value is essential for an optimized design performance. Any effect of the circuit function or any other characteristics is caused by a change in one or more of these parameters and correlations in between. In the case of OFFT or optical systems in general, phase plays an important role, since most of the operation in optics is via interference patterns. Xu, H., Li, X., Xiao, X., Li, Z., Yu, Y., & Yu, J. (2014), Demonstration and Characterization of High-Speed Silicon Depletion-Mode Mach-Zehnder Modulators, IEEE Journal of Selected Topics in Quantum Electronics, 20(4), 23-32, doi: 10.1109/jstqe.2013.2293763; Iordache, M., Dumitriu, L., & Niculae, D. (2008), ON THE SENSITIVITY ANALYSIS OF ANALOG CIRCUITS, Annals of the University of Craiova, Electrical Engineering series, 32, 1-6.

The OFFT is a system of cascaded interferometers. In this case Mach Zehnder Interferometers are used and to obtain an understanding of their output as a function of frequency (and phase) it is vital to study the transfer function of the MZI's (optical couplers and delay lines) at the output of the OFFT. The OFFT transfer function as a function of phase, time delay and loss, can determine the quality and sensitivity of the system as a function of these parameters respectively.

Another important feature is based on the extinction ratio of the cascaded MZI's. Extinction ratio which is simply the ratio between the maximum and minimum power (intensity) levels of the transfer function can be used here to determine how the quality of the OFFT changes as a function of the mentioned parameters. See Hellerkus 1, 2; M. E. Marhic, "Discrete Fourier transforms by single-mode star networks," Opt. Lett. 12(1), 63-65 (1987).

Approach: Overview of OFFT Dependence to Phase, Delay, and Power

We sweep the values of phase, frequency, loss/delay in the first MZI (because it has the most impact in the frequency domain) of system and observe the quality of the FFT at its output. FIG. 3.1 shows the sensitivity of the output at a fixed frequency where one of the outputs has the maximum transmission, and then sweep the phase to show the reader how sensitive the system is to phase. And for most communication systems where a 20 dB power degradation can be tolerated, the maximum phase shift the system can handle without being tuned is 0.2 Radians (FIG. 3.4). FIG. 3.3(a) shows the filtering of frequency that the OFFT does. After all the FFT is a frequency filtering device (this is where choose one point in frequency to analyze the phase detuning). The figures show the quality of the OFFT as a function of phase by defining the SNR and power mismatch between the MZI arms. FIGS. 3.9 and 3.10 are different ways of showing the degradation that happens in the OFFT as a function of phase change (it is 3D and complicated to explain further in simple terms—you can read that section). FIG. 3.7 shows the change in the OFFT output as a function of loss and delay—it matches the analytical results from a coupler—this is expected and shows that the system works well. FIG. 3.8 shows the performance of OFFT and compares its figure of merit to the NVIDIA GPU's and shows that OFFT performs with lower power as N increases in comparison to $P_{100}$ GPU's.

We investigate the sensitivity of the SOI-based OFFT on-chip with respect to phase, amplitude and delay (assumption: before the sampling modulators act on the optical signals-optical filtering. Sampling is essential however for an OFFT system due to its continuous operational mode. To take advantage of the OFFT system in an electronic implementation, for highest throughput, the optical signal must be sampled for all samples $x_n$ in synchronization over a duration of T/N given that the waveguides interconnecting the couplers maintain equal delay and proper phase relations). See Ch. 3:6 of the priority provisional application. In the present invention, as shown in (FIG. 3.1) we sweep the parameters (i.e. phase, time delay and loss) of the lower arm of the first stage interferometer since it has the most impact-has the highest oscillation and narrow spacing in the frequency domain. See Ch. 3:7 of the priority provisional. on the overall transfer function of the OFFT and helps with gaining knowledge and understanding on the quality of the OFFT output. (Note that the impact from the $2^{nd}$ stage interferometer however is similar, but less critical since it does not affect all the outputs). This can be obtained by analyzing the extinction ratio/power mismatch ratio, SNR, and FOM of the cascaded MZI through its transfer functions. See FIGS. 3.1 and 3.4(b).

FIG. 3.1 shows Sensitivity Analysis Tests on the OFFT's first stage interferometer in terms of (FIG. 3.1(a)) phase sweep from $$\frac{\pi}{2} \pm \frac{\pi}{2}$$

with increments of $$\frac{\pi}{100},$$

(FIG. 3.1(b)) time delay from $$12.5 \pm 12.5 \text{ Ps} \left( \frac{T}{4} \pm \frac{T}{4} \right) \text{ Ps}$$

Ps with increments of 0.5 pico sec c) optical loss from 12.5±12.5 dB with increments of 0.5 dB (for the $1^{st}$ stage MZI) and 6.25±6.25 dB with increments of 0.25 dB, and (FIG. 3.1(d)) physical changes for delay from 1.5±1.5 mm with increments of 0.06 mm corresponding to the same loss as mentioned in FIG. 3.1(c).

Phase

Phase is the first and the most important parameter that is studied in the OFFT sensitivity analysis. Since OFFT is a system of delayed interferometers, we show that it is the most sensitive to phase in comparison to delay (different in the arm lengths) and loss. The OFFT is a data processing tool whose input is an analog signal and whose output is its analog spectral analysis. The discrete nature of the OFFT yields intrinsic quantization errors and sampling artifacts that are function of the phase. In this investigation, we sweep the phase of the lower arm of the interferometer in the first stage of the OFFT from 0 to π with increments of $$\frac{\pi}{100}$$

and analyze the change in the transfer functions of the output of the OFFT. Fast Fourier Transform (or a 4 point-DFT in this case since there are four outputs) is performed by encoding optical data (analog) to discretized samples for parallel computation (i.e. a temporal laser beam data transfers into time samples in the frequency domain). The data is manipulated at 10 GHz by amplitude modulation (executed externally off-chip) of the light waves.

After sinusoidal modulation (off-chip), pure sine wave test signal is generated at the input signal at 10 GHz system frequency (40 GHz the whole OFFT frequency range) such that the input signal goes through with a whole number of cycles (one period at a time). A certain decrease or increase in phase of the MZI, creates a frequency increment that is considered a spectral leakage. We chose 10 GHz to enable a suitable measurement environment (given available modulators in the market; ideally 100 GHz would be the goal, but that is currently too expensive) where time delay is T=1/f=100 ps, T/2=50 ps, and T/4=25 ps respectively. The number of delay lines will be $C_{DL}=2(N-1)$, and the number of phase shifters, $C_\phi=N \log_2(N)$. This is to simply perform arithmetic's on the signal (as the adder and subtractor do in a conventional FFT) by adjusting the phase—if the input signals a sin(x) and b sin(x) are in phase, their amplitudes will be added and if they are out of phase their amplitudes would be subtracted from each other (The idea is due to the constructive and deconstructive interferences in any (MZI in this case) interferometer) as shown below:

$$a \sin(x) \pm b \sin(x) = (a \pm b)\sin(x)$$

By sweeping the phase in an antisymmetric fashion in the first stage of the OFFT, a representation of the change in the output transmission powers as a function of phase is shown in FIG. 3.3(*b*). Depending on the phase, we obtain a redistribution of the power at the ideal probe frequency (highest transmission) (see FIG. 3.3(*a*)). In this case we took a slice of the data out from the frequency sweep at the ideal case of phase ($\Delta\phi=0$), at which the ideal extinction ratio was observed at 6.78 GHz (FIG. 3.3(*a*)). Similar to that of the phase sweep, we looked into the transfer function values of all four outputs of the OFFT at the frequency range from 0-40 GHz with increments of 0.01 GHz or 10 MHz. This is not exactly at 10 GHz, because the physical length of the waveguides were based on the design specs and a slight change in length, shifts the frequency as well.

This structure in FIG. 3.3(*a*) shows the frequency filtering correctly executed by the OFFT as a function of the input frequency sweep and the spectral leakages from the different output bins (these bins are defined based on the system frequency 10 GHz, where the frequency spacing in the frequency domain is based off of)—those are unavoidable and part of the nature of the FFT as there are only certain frequencies possible and defined that fit in one time window at a time). In this case the first peak in transmission at the ideal phase and frequency of 6.78 GHz at $x_2$. At this point the transmission for $x_2$ is 1 and from the other output ports 0 contributions can be observed. At the ideal case when the phase change in the lower arm of the interferometer is 0, all the power goes to the second branch of the top interferometer $x_2$ due to the $\pi$ additional phase (the relative phase difference in bidirectional coupler arms) coming from the interferometer's geometry in the system design.

When we sweep the phase, the transfer function's maximum shows a decreasing behavior where the smaller phase leakages lead to an increase, so gradually the $x_2$ power decreases since most of the power from the first interferometers shifts to the top of the $2^{nd}$ stage lower interferometer and comes out of $x_1$ at the next frequency probe (16.78 GHz) since each output bin in the frequency domain has a 10 GHz spacing that comes from the system frequency. Note that since this is a cascaded geometry, the sum of all the output powers must add up to 1 (normalized value). By sweeping the frequency, we can find points at which the OFFT gives full transmission. The different phase values can shift the transfer function left and right in frequency however.

In the ideal case of no additional phase and at different probe frequencies, full transmission can be achieved, however sweeping the phase, changes the output amplitudes respectively when the maximum transmission decreases until it reaches a very small ~0 value and the next full transmission from another output port is achieved. This is due to the way FFT works as a filter for different frequency values. Phase sweep at the ideal frequency probe value can move the transfer function to lower or higher frequency values. Note that the value of 6.78 GHz is not significant as it can be shifted by shifting phase. Phase sweep or detuning analysis is another dimension to the (input) frequency sweep. The present invention shows the importance of phase alignment and probe frequency in determining how well the OFFT can filter the frequencies based on the number of samples N.

To determine the overall quality of this cascaded system of interferometers, it is valuable to set a threshold for the detuning in phase that system allows for the needed transmission power output. To do so, we look into the impairment or the degradation in the transmission values of the OFFT outputs as a function of phase sweep. This is obtained by finding the difference in the transfer function of the OFFT outputs as a function of phase relative to the ideal case at 0 phase. In the ideal case of 0 phase, except $x_2$ which has the maximum transmission (at 6.78 GHz), the impairments start at very small values and potentially can go up to 1 because by shifting the phase, you can shift the transfer function and each of these output ports becomes 1 at some point-meaning that the impairment can increase to 1.

This is the degradation in power (FIG. 3.3(*b*)); at first $x_2$ has full transmission where the contributions from other frequency components is minimal, and by sweeping the phase, changes in the transfer function indicate that the degradation increases. The two neighboring outputs change more drastically due to crosstalk among the channels (if $x_2$ is high then $x_0$ is low). If the phase of the $1^{st}$ stage MZI is mis-aligned then the OFFT will no longer work properly and in we investigate on how much the system of the present invention can tolerate this detuning in phase. However, this can be application related, for instance in telecommunication, a 20 dB loss (or a factor of 0.01 in power ratio) (see Ch. 3:7 of priority provisional) can be the maximum toleration of the OFFT difference in transmission power whereas in some other applications with less requirements for the overall quality of the OFFT, a 10 dB loss (a factor of 0.1 in power ratio) can be the detuning in power allowed.

As shown in (FIGS. 3.4(*a*) and 3.4(*b*)), for the case where the threshold is at −20 dB, the maximum phase tolerance is 0.2 radians or less and for the case of −10 dB loss, the phase tolerance of 0.6 radians or less. As it can be clearly observed from the results, the phase error that can be tolerated in the OFFT system is not large, hence the phase has to be very precise. It is important to set a threshold for the power difference required- and this really depends on how precise one wants the OFFT to operate in their system/application. In the case of 10 dB and 20 dB loss, power transmission thresholds, the system has to maintain the phase within the ideal to 0.2 and 0.6 radians or less (tolerable region) respectively. Values in phase higher than the ones stated, would be consider leakages in phase. Note that the initial phase error is small, but very quickly as can be seen in (FIG. 3.4(a)) it becomes significant and shows a nonlinear behavior.

Ideally, it is best to keep the OFFT system at 0 target phase, but due to the instability in post-tape out processing and the measurement environments, very small tolerance for phase can be considered given the desired power ratio difference allowed in a given system that benefits from OFFT. Outliers can be observed in (FIGS. 3.3, 3.4), which are due to numerical precision errors and glitches in the simulation environment.

To understand the effect of phase on the system, the signal to noise ratio (SNR) and the power mismatch ratio between the MZI arms was obtained to determine a meaningful figure of merit (FOM) or rather a performance parameter for which it determines the sensitivity of the system as a function of the phase detuning. This is critical since it is important to understand the range at which the OFFT can be operated with minimal sacrifice and/or maximum stability and quality. Further studies on the phase sweep is possible by tweaking the phase parameter in the $2^{nd}$ stage of the OFFT, but that brings more complexity into the system as the phase is the major tool for the mathematical operations and given the cascaded geometry, too many changes might be hard to approach and draw a conclusion from. Hence in the present invention we only focus on the first interferometer, but in later studies, interferometers in the second stage can also be studied in terms of their impact on the overall behavior of the OFFT transfer function.

To find the SNR another analysis was performed by taking the difference in the transfer functions/transmission output power values in regards to the ideal case where the phase is 0. This shows the degradation in the system as a function phase detuning and can be seen in (FIG. 5.5).

FIG. 3.2 shows OFFT geometry in the ideal case and outputs in binary format. FIG. 3.3 shows Phase Sensitivity Analysis on the transmission power (transfer function) of OFFT at 6.78 GHz along with the frequency filtering of the OFFT (FIG. 3.3 (a)). To better understand the true meaning of these analysis a careful study on the SNR and FOM of the OFFT in terms of the phase sensitivity was performed. FIG. 3.4 shows Degradation/Impairment generated as a function of phase sweep (difference in the transfer functions of the OFFT output in regards to the ideal case at 6.78 GHz) for a) 20 dB loss tolerance 20 dB loss tolerance and b) the figure of merit description as of such as a function of detuning phase at 6.78 GHz.

It is important to note that the above simulations and graphs are only for the completely ideal cases and sweeps. For the actual fabricated chips from our OFFT design these results however will not necessarily match due to the lack of certainty from the foundry fabrications from roughness and sidewall scattering and extra loss components. However understanding the range at which the heaters (with respect to a certain temperature value) can be tuned in phase values of interest is essential—this exact value is shown in (FIG. 3.4) with the threshold values for phase given the tolerable loss. Given this threshold, the maximum phase tolerance is <0.2 radians to ensure acceptable spectral leakage, i.e. channel crosstalk (FIG. 3.4). Physically this range corresponds to a 0.54 K temperature change that the waveguide index can tolerate in order to stay keep within less than the −20 dB attenuation threshold. Clearly, the phase control must be very precise and the required temperature difference needs a careful environment control to be achieved. The best way to approach this is to place the OFFT chip in ambient chambers with temperature isolation such that the heat could be transported to only the specific areas as desired. Alternatively, control loops and temperature stabilization of the chip could also be employed. Indeed, we observe a non-linear phase error, which is likely due to nature of cascaded interferometers and their phase sensitivity in regards with respect to physical delay lines. In order to see the effects of phase detuning errors and distortions in the signal, a rigorous study is performed in terms of the transmission power at the OFFT output and the difference in the transmission power as a function of phase ($P_{degradation}$).

Now, using the data gathered from the phase and frequency sweeps, we can use them to calculate the SNR in the system. The SNR was calculated using the output power and the degradation in respect to the ideal case with no phase detuning and phase sweep at 6.78 GHz in this case.

$$SNR = \frac{P_{out} - P_{Noise}}{P_{Noise}}$$

Since the simulation shows the ideal case of the system with no extra loss (from bending, roughness of the edges of the waveguide, or other fabrication related losses), thus the noise distributed to the system is symmetrical for the top and bottom interferometers in the second stage connected to the first stage MZI. At the correct probe frequency, the SNR for $x_0$, $x_2$, $x_1$, and $x_3$ would be the same. Their FOM's follow the same pattern as well.

$$P_{mismatchRatio} = \frac{P_{out1}(\phi)}{P_{out2}(\phi)}$$

$$FOM = \frac{SNR}{P_{mismatchratio}}$$

FIG. 3.4(b) shows FOM as a function phase at 6.78 GHz. The idea behind the definition of FOM here is that the smallest the power mismatch ratio $P_{mismatchratio}$ close to 0, and the highest the SNR in the system, the higher is the quality of the OFFT as a function of phase. As a result the system seems to have the highest value of FOM at the ideal phase 0 case as expected for $x_2$ since the power mismatch ratio between $x_2$ and $x_0$ is close to 0 the FOM leads to infinity at the ideal phase. As we sweep the phase detuning, this power mismatch ratio increases and the FOM decrease—similar trend to SNR. For the case of $x_1$ and $x_3$ however, since their transmission is minimal for frequency contribution at 6.78 GHz, their SNR values are low-despite the fact the power mismatch ratio is almost 1 in this case because of the low SNR, the FOM is also very low. Again, this maximum FOM can be seen for all four outputs of the OFFT at the correct frequency value for each bin. As the phase is swept the FOM also decreases drastically for $x_2$ and even further for $x_3$.

The goal in the phase tuning is to make sure that the maxima of the cascaded interferometers end up on the same value as the previous interferometer. Frequency of each bin is also spaced out by the system frequency of 10 GHz.

Time Delay (Physical Delay)

The OFFT comprise imbalanced MZI's that are determined based on the necessary time delay needed in the system, FIG. 3.5. This delay is due to the parallel form of computation that DFT entails that allows one input signal to branch out to N point with the T/N delay lines respectively for different stages. For the case of N=4 there are two stages. The first stage with T/2 and in fabrication process with 6 mm delay lines has an imbalance of 5.5 mm approximately and for T/4 the 3 mm with an imbalance of 2.5 mm. This large difference in length causes a mismatch in the output power of the cascaded MZI. As a result the investigation on how that will change the quality of the OFFT is implemented using Lumerical Interconnect by sweeping the imbalance length with an increment of 1.5±1.5 mm. As shown in (FIG. 3.7). Note that the extinction ratio here was defined as the maximum output power over the minimum power as a function of delay lines. Since the behavior is very similar for all the output ports we only show the behavior of $x_0$.

$$ER = \frac{P_{max}(T_{delay})}{P_{min}(T_{delay})}$$

As it can be seen in FIG. 3.7, the quality of the extinction ratio tends to have a downward behavior as the imbalance length starts to increase in the lower arm of the Mach Zehnder. As the length increases the power mismatch between the MZI outputs starts to rise up and the extinction ratio decreases. Since the change in the delay of the system means changing the physical length of the waveguides, thus the loss (power mismatch) also changes. Loss has an exponential behavior with the length of the waveguide. The additional jumps in the graph are due to the selection of the right frequency points—since changing the length means shifting the frequency—and the numerical precision errors from the software. Changing the physical length or changing the loss, have the same impact on the extinction ratio. Taking more points in the frequency domain and longer simulations, could help minimize these misalignments.

This was obtained by adding/subtracting the waveguide length (with increments of 0.06 mm corresponding to 0.5 Pico second) in the lower arm with the effective index that was calculated based on the OFFT passive and active design.

FIG. 3.5 shows a physical sweep of length in the delay lines of the $1^{st}$ stage MZI of the OFFT system. FIG. 3.7 shows an Extinction Ratio of the physical full system OFFT as a function of changing physical length (delay) in the lower arm of the first stage interferometer-output port $x_0$. FIG. 3.7(b) is a linear fit of FIG. 3.7(a) with many outliers due to the phase mismatch in the cascaded interferometers and simulation numerical precision errors.

Optical Loss

Earlier in the Optical delay lines section the power mismatch was discussed. It is important to note that for a perfect OFFT filtering and optimal transmission in communication systems, the power of the output of the MZI arms need to match relatively close in value. This is however a big challenge since in our OFFT design the MZI arms have different lengths (spiral waveguides) due to creating parallel signal from one optical laser source.

FIG. 3.6 is a sweep (changing values with a certain increment) of the passive and physical optical loss in the $1^{st}$ and $2^{nd}$ stages of the MZI of the OFFT system (loss was swept in both stages since otherwise the power mismatch would create meaningless result).

For the case of a four (4) point OFFT operating with a system frequency at 10 GHz, given the loss from ANT, the loss in the longer arm of the first MZI (6 mm) is 2.94 dB whereas for the straight shorter waveguide it is 0.075 dB. This is very critical for the performance of the FFT since with a high power mismatch combining these two signals at the output couplers practically gives a signal with no meaningful data (i.e. adding one infinitely large and one very small number). In order to avoid that, extra power loss were applied to the shorter arm to compensate for this difference. This was obtained by adding additional bends with sharp angles <90 degrees to add up to the existing loss in the arm and match the lower longer arm. Note that due to fabrication, the two arms of the cascaded MZI's might not necessarily have exact values, but they can be designed to relatively be equal. In addition, it is valuable to know how sensitive the system is due to these changes in optical power loss as a function of optical delay lines; thus two different studies were performed: similar to the time delay, one was adding and subtracting an optical loss component to the lower arm of the MZI in the first stage, and the other was to physically change the length (add or subtract) of the waveguide which is identical to that of the optical delay lines physical analysis. We only show the physical change since both results are similar.

Note that the extinction ratio here was defined similar to that of the time delay, as the maximum output power over the minimum power as a function of additional optical loss. Since the behavior is very similar for all the output ports we only show the behavior of $x_0$.

$$ER = \frac{P_{max}(\gamma_{loss})}{P_{min}(\gamma_{loss})} \quad (5.13)$$

The graph below shows the ER of the OFFT system as a function of additional loss (0-12.5 dB with increments of 0.25 dB for T/4 and 0.5 dB for T/2) added and subtracted from the OFFT. To better understand the procedure obtained here, first we start with the physical delay lines and its corresponding time delay; where for every 0.5 Pico second there is a 0.06 mm of physical delay line that corresponds to 0.0294 dB, thus all the loss values are calculated like that. This is shown in (FIG. 3.7) by comparing the extinction ratio for the loss to time delay and that they match:

FIG. 3.7 shows the calculation of additional loss in terms of the physical delay lines—extinction ratios match meaning that loss and physical delay have the same effect on the extinction ratio of the OFFT. Using the above calculation the extinction ratio was obtained for loss values of 2.5±2.5 with increments of 0.25. As shown in the graph, similar to that of the time delay, as the loss increases, it is as if the length imbalance increases, due to the power mismatch, the quality of the OFFT has a downward trend. So the ideal case is for the case when the loss in the lower arm is reduced by 2 to 2.5 dB as shown in the first few points of the ER diagram. The extinction ratio of the cascaded MZI is large here compared to typical extinction ratio values for interferometers, but this is a simulation based graph and far from real value results from fabrication.

FIG. 3.7(a) shows an extinction ratio of the OFFT full system as a function of physical optical loss from the spiral waveguides (delay lines). FIG. 3.7(b) shows an analytical exponential fit of FIG. 3.7(a) based on an ideal coupler. The results from the optical loss match exactly with the optical delay lines (hence shown both in FIG. 3.7).

As earlier stated in the optical delay section (see FIG. 3.7) loss is exponential with the length of the waveguide or time delay in the system. This can be analytically understood by comparing the extinction ratio of the output couplers where the two inputs (delayed signals) are added (in amplitude) and squared for their power values in the top output and subtracted and squared in the bottom output.

$$P \propto \text{Amplitude}^2$$

$$ER_{coupler} = \frac{(a+b)^2}{(a-b)^2}$$

Ideally you want $(a+b)^2$ to be larger than $(a-b)^2$ so the maximum extinction ratio is achieved. This was fit into the graph of FIG. 3.7(*b*) and shows that the OFFT follows the same trend. A study on the behavior of the OFFT as a function of phase, time delay, and optical loss has been demonstrated. Optimal values for operating the system was shown however for overall improvements on the behavior and optimization of the power and energy in the OFFT, measurements on the fabricated passive and active FFT can help determine the sweet spot for operating the OFFT more accurately.

The FFT data capacity, the number of bits that can be propagated through the system depends on the modulation type. Assuming QAM 256 for a high SNR channel with a bandwidth of 10 GHz the upper bound for bandwidth is 80 Gbps for a single OFFT channel and 320 Gbps for N=4.

While we have analyzed the sensitivity and performance for N=4, it is interesting to ask how larger systems scale. Increasing the number of samples (N), the FFT grows with (N−1) cascaded delayed interferometers and 2(N−1) couplers. [are these formulas correct?] Unlike an electronic FFT, which scales with approximately 5N log_2N, the optical FFT will need to compensate for increasing optical losses with greater optical power. Analysis, FIG. 3.8 shows performance peaks for small N and outperforms an electronic (NVIDIA P100 GPU) for N<200. See Harris.

In conclusion, we explored the design and fabrication of active and passive silicon photonics based N=4 point all optical fast Fourier transform with heating tunability and sampling on-chip. In addition, the sensitivity of the OFFT chip with respect to the phase, time delay (optical loss) was analyzed. The system showed 0.2 radians phase threshold value for a telecommunication-based system with 20 dB tolerance in power loss. Thus the phase control using the thermo-optic effect must be obtained precisely. Careful measurements and suitable environment i.e. an ambient chamber with temperature isolation or temperature stabilization potentially in conjunction with control loops are necessary for an accurate control on the change in phase and guaranteeing optimal and high quality performance for the OFFT. Other OFFTs can be provided other than 4-points by cascading those from the N=4 OFFT.

FIG. 3.8 shows an analysis of the optical FFT shows up to three orders of magnitude more performance than a GPU (NVIDIA P100) for N<200 using a figure of merit of 1D FFT per second-Watt-Area assuming 0.9 dB insertion loss for couplers, 3.5 dB insertion loss for y-branches, 3.5 dB insertion loss for the modulator, 0.7 dB insertion loss for the first spiral, with linear scaling, photodetector power of 2.4 µW, and minimum optical power at the photodetector of 250 µW.

CONCLUSION

This invention provides solutions to one of the most useful techniques in communication (FFT) and new techniques to go beyond the classical electronic FFT's in terms of speed and power usage in addition to the sensitivity analysis for a better understanding in terms of stable performance regions and quality output. The trend on optical integrated circuits is achieving more power and energy efficient devices/circuits. Even though the current implementation of the OFFT uses high sampling speed and data bandwidth with minimal power in comparison to the available technologies out there such as the NVIDIA GPU's, but further optimization on power usage of components (passive optical devices (optical loss): waveguides and couplers) and devices (modulators, photodetectors, ADC, DAC converters) can be the next stepping stone for a new era in low power nano-photonics and optical processing.

From here OFFT can be implemented both as a processing unit in complicated analog processors such as radars in aviation technologies for increasing data collection and exchange with low power usage, or as a unique remote processing unit for improvement in cyber security applications by reducing number of data breach that come from using bulk optical fibers and processing units. In addition to its computational properties, OFFT can be used in communications as well. One popular application is the OFDM transceivers. This technology does exist now in bulk, but given the on chip FFT performance and power savings it brings to the picture, a faster performance in parallel using WDM channels can improve the performance since the OFFT presented was for a single channel (transmitting and receiving signals) to a range close to 100's of Tbits/sec (in order of magnitude). The faster the system frequency the more footprint can be saved.

Furthermore, other future directions include a careful measurement and measurement environment on the active and passive on chip devices that were fabricated for the purpose of the present invention. Note that a CMOS compatible environment is necessary for controlling the temperature needed to change the necessary phase change in the OFFT and this requires a careful analysis on the oxide layer on top of the chip in terms of conductivity and thermal isolation. Hence a new set of sensitivity analysis on the actual OFFT chips, and comparing them to the theory and simulations results can come useful. The results can determine the weaknesses and strengths of the current designs can be analyzed and understood for the next generation of OFFT prototypes and implementations in the current semiconductor technologies.

In conclusion, the present invention provides two different designs (active and passive) for a 4 point all optical fast Fourier transform on chip using a heating tunability and sampling on chip. In addition the sensitivity of the OFFT chip with respect to three different parameters such as phase, time delay, and optical loss was analyzed. The system showed more sensitivity to phase in performance and quality in comparison to time delay and optical loss, however those are important quantities to the quality of the FFT output. In addition optical delay lines determine the speed of operation and thus, modulating the system at a faster rate, means less physical delay lines, and hence faster operation.

It is further noted that the invention was described with spirals, heaters and bends in specific locations. It should be appreciated that any number of spirals, heaters and/or bends can be provided, or no heaters or bends can be provided, and the location of the spirals, heaters and bends can be moved depending on the specific application. For example, though one spiral is shown for each arm of an interferometer, more than one spiral can be provided. And, thermal insulators or buffers can be provided to prevent the heaters from spreading to other areas of the chip.

Many of the signal processing applications depend on electronic devices which will present a bottleneck to further provide higher capacity and lower cost implementations. The maximum transmission capacity is limited by the speed and power consumption. These constraints can be bypassed by implementation of all optical devices on chip. Taking advantage of silicon photonics chips and bringing the idea of the optical FFT to it, forms a strong backbone for the next generation of on-chip technologies and optical communication, which are aimed for a range of applications in computation, optical interconnects, and communication networks. The on-chip OFFT not only brings optimization in performance but it also allows flexibility in terms of the processing and security into the fiber-optic networks and applications in programmable photonics circuits. The active design integrates everything and is low power.

Accordingly, the present invention provides an on-chip (i.e., integrated circuit) solution that provides phase control, temperature regulation, crosstalk, and loss-management, despite the ever-growing need to have more contacts for control closer together. The performance is higher since the delay is shorter. The invention takes the refractive index of silicon into account (along with the losses that each foundry has for the fabrication of their straight/spiral waveguides). While the invention is described and shown to implement an FFT operation, it should be recognized that it can be utilized for any suitable representations or mathematical operations.

It is further noted that the description uses several geometric or relational terms, such as parallel, spiral, and straight. In addition, the description uses several directional or positioning terms and the like, such as top and bottom. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, lines may not be exactly a spiral but still be considered to be substantially a spiral because of, for example, roughness of surfaces, tolerances allowed in manufacturing, etc. And, other suitable geometries and relationships can be provided without departing from the spirit and scope of the invention.

The concepts of performing an FFT in an integrated optics platform can, in addition to the passive photonics waveguide platform described here, also be realized using other integrated optics waveguides to include hybrid plasmon-photon modes, or pure plasmonic modes.

It is noted that all the references and papers cited above are herein incorporated by reference. The following references are also incorporated herein by reference: H. Nejadriahi et al., "On-Chip Integrated All-Optical Fast Fourier Transform: Design and Sensitivity Analysis," in Frontiers in Optics 2017, OSA Technical Digest (online) (Optical Society of America, 2017), paper JW4A.46.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A temporal photonic integrated Fast Fourier Transform circuit, comprising:
    a photonic integrated on-chip input for receiving an optical signal from a source; and
    a photonic integrated on-chip first stage having a first interferometer with a first stage output, and a photonic integrated on-chip second stage having a second interferometer and a third interferometer, the second and third interferometers receiving the first stage output and having a second stage output, wherein each of said first, second and third interferometers each comprise a first arm and a second arm parallel to the first arm, the first arm forming a first waveguide and the second arm having a spiral waveguide, and further comprising first arm output from the first waveguide and a second arm output from the spiral waveguide, said first, second and third interferometers further comprising a coupler to couple the first arm output and the second arm output, wherein the spiral waveguide imparts a phase delay to the optical signal whereby said circuit conducts Fast Fourier Transform.

2. The circuit of claim 1, wherein the optical signal is modulated.

3. The circuit of claim 1, wherein the first waveguide is straight.

4. The circuit of claim 1, wherein the first waveguide has one or more bends.

5. The circuit of claim 4, wherein the one or more bends compensate for optical power loss by the spiral waveguide.

6. The circuit of claim 1, wherein the first waveguide has a plurality of inversely positioned U-shaped bends that compensate for optical power loss by the spiral waveguide.

7. The circuit of claim 4, wherein the bends provide a power on the first arm that substantially matches power on the second arm.

8. The circuit of claim 1, further comprising an integrated on-chip heater formed on the first waveguide.

9. The circuit of claim 8, wherein the heater modifies the phase of the optical signal on the first arm to compensate for a phase shift on the second arm and align the phase of the optical signal on the first arm with the phase of the optical signal on the second arm.

10. The circuit of claim 1, wherein the first, second and third interferometers are each Mach Zehnder Interferometers (MZI).

11. The circuit of claim 1, further comprising a photonic integrated on-chip modulator receiving an output from the second and third interferometers.

12. The circuit of claim 11, wherein the modulator comprises a Michelson Interferometer Modulator (MIM).

13. The circuit of claim 1, further comprising a first and second photonic integrated on-chip modulator coupled with an output from the second interferometer, and a third and fourth photonic integrated on-chip modulator coupled with an output from the third interferometer.

14. The circuit of claim 1, wherein the coupler adds and/or subtracts the first arm output and the second arm output and splits the added/subtracted first and second arm outputs to provide the first stage output and the second stage output, respectively.

15. The circuit of claim 14, further comprising a photonic integrated on-chip photodetector that detects an output of said circuit.

16. A temporal photonic integrated Fast Fourier Transform circuit having n-stages with $2^n$ outputs, where n is an integer greater than 1, comprising:
- a photonic integrated on-chip input for receiving an optical signal from a source; and
- a photonic integrated on-chip having n stages, each stage having $2(n-1)$ interferometers, and each interferometer having a first arm and a second arm parallel to the first arm, the first arm forming a first waveguide providing a first arm output and the second arm having a spiral waveguide providing a second arm output, said interferometers each further having a coupler to couple the first arm output and the second arm output to provide a coupled output, wherein the interferometer of a first stage receives the optical signal from the source and the interferometers from each subsequent stage receives the coupled output from the prior stage, wherein the spiral waveguide imparts a phase delay to the optical signal whereby said circuit conducts Fast Fourier Transform.

17. The circuit of claim 16, wherein the first arm has one or more bends that compensate for optical power loss by the spiral waveguide of the second arm.

18. The circuit of claim 16, further comprising a photonic integrated on-chip heater formed on the first waveguide, wherein the heater modifies the phase of the optical signal on the first arm to compensate for a phase shift on the second arm and align the phase of the optical signal on the first arm with the phase of the optical signal on the second arm.

19. The circuit of claim 16, further comprising a photonic integrated on-chip modulator that modulate the second stage output.

20. The circuit of claim 16, wherein the coupler adds and/or subtracts the first arm output and the second arm output and splits the added/subtracted first and second arm outputs to provide the first stage output and second stage output, respectively.

21. The circuit of claim 20, further comprising a photonic integrated on-chip detector that detects the second stage output.

22. A temporal photonic, plasmonic, or hybrid photonic/plasmonic integrated Fast Fourier Transform circuit having n stages and $2^n$ outputs, where n is an integer greater than 1, comprising:
- a photonic, plasmonic, or hybrid photonic/plasmonic integrated on-chip input for receiving an optical signal from a source; and
- a photonic, plasmonic, or hybrid photonic/plasmonic integrated on-chip having n stages, each stage having $2(n-1)$ interferometers, and each interferometer having a first arm and a second arm parallel to the first arm, the first arm forming a first waveguide providing a first arm output and the second arm having a spiral waveguide providing a second arm output, said interferometers each further having a coupler to couple the first arm output and the second arm output to provide a coupled output, wherein the interferometer of a first stage receives the optical signal from the source and the interferometers from each subsequent stage receives the coupled output from the prior stage, wherein the spiral waveguide imparts a phase delay to the optical signal whereby said circuit conducts Fast Fourier Transform.

23. The circuit of claim 22, further comprising:
- a photonic, plasmonic, or hybrid photonic/plasmonic integrated on-chip heater formed on the first waveguide, wherein the heater modifies the phase of the optical signal on the first arm to compensate for a phase shift on the second arm and align the phase of the optical signal on the first arm with the phase of the optical signal on the second arm;
- a photonic, plasmonic, or hybrid photonic/plasmonic integrated on-chip modulator that modulate the second stage output; and
- a photonic, plasmonic, or hybrid photonic/plasmonic integrated on-chip detector that detects the second stage output.

24. The circuit of claim 22, wherein each interferometer comprises a Mach Zehnder interferometer (MZI).

25. The circuit of claim 16, wherein each interferometer comprises a Mach Zehnder Interferometer (MZI).

* * * * *